(12) United States Patent
Mohr et al.

(10) Patent No.: US 10,419,316 B2
(45) Date of Patent: Sep. 17, 2019

(54) CONTROL SYSTEM

(71) Applicant: KATHREIN SE, Rosenheim (DE)

(72) Inventors: Markus Mohr, Rosenheim (DE); Johann Schmid, Riedering (DE)

(73) Assignee: KATHREIN SE, Rosenheim (DE)

( * ) Notice: Subject to any disclaimer, the term of this patent is extended or adjusted under 35 U.S.C. 154(b) by 7 days.

(21) Appl. No.: 15/705,180

(22) Filed: Sep. 14, 2017

(65) Prior Publication Data
US 2018/0077039 A1  Mar. 15, 2018

(30) Foreign Application Priority Data

Sep. 14, 2016  (DE) .......................... 10 2016 011 153

(51) Int. Cl.
*H04L 12/26* (2006.01)
*H04W 88/08* (2009.01)
*H04B 7/00* (2006.01)

(52) U.S. Cl.
CPC ........... *H04L 43/0858* (2013.01); *H04B 7/00* (2013.01); *H04L 43/067* (2013.01); *H04W 88/085* (2013.01); *H04W 88/08* (2013.01)

(58) Field of Classification Search
CPC . H04L 43/0858; H04L 88/085; H04L 43/067; H04W 88/08
See application file for complete search history.

(56) References Cited

U.S. PATENT DOCUMENTS

| | | | |
|---|---|---|---|
| 6,239,744 B1 | 5/2001 | Singer et al. | |
| 8,018,390 B2 * | 9/2011 | Davidson | H01Q 1/246 343/754 |
| 9,136,938 B1 * | 9/2015 | Babich | H04B 7/22 |
| 2002/0167954 A1 * | 11/2002 | Highsmith | H04L 12/2856 370/406 |

FOREIGN PATENT DOCUMENTS

| | | |
|---|---|---|
| DE | 60028466 T2 | 12/2006 |
| GB | 2414137 A | 11/2005 |

* cited by examiner

*Primary Examiner* — Mohammad S Anwar
(74) *Attorney, Agent, or Firm* — McCoy Russell LLP

(57) ABSTRACT

A control system includes a master, at least one slave, and a communication module arranged between the master and the at least one slave, through which the master and the at least one slave communicate. The master sends control commands for controlling the at least one slave and the at least one slave responds to the control commands of the master. The communication module relays the respective control commands and responses. The master transmits to the communication module in one or a plurality of requests at least one control command and at least one associated timing requirement, the communication module processes the request(s) by sending the at least one control command according to the at least one timing requirement to the at least one slave, and the communication module determines timing information concerning the communication with the at least one slave and sends said timing information to the master.

16 Claims, 21 Drawing Sheets

CONTROL SYSTEM

CROSS REFERENCE TO RELATED APPLICATION

This application claims priority to German Patent Application No. 10 2016 011 153.4, entitled "Control System," filed Sep. 14, 2016, the entire contents of which is hereby incorporated by reference in its entirety for all purposes.

TECHNICAL FIELD

The present disclosure relates to a control system comprising a master, at least one slave, and a communication module which is arranged between the master and the at least one slave and through which the master and the at least one slave communicate, wherein the master sends control commands for controlling the at least one slave and said at least one slave responds to the control commands of the master, and wherein the communication module relays the respective control commands and responses.

BACKGROUND AND SUMMARY

Relays are known as communication modules, which are arranged between master and slaves and which only relay the data exchanged between the master and the slave and serve e.g. for amplifying the physical signal.

Control systems comprising a master and one or a plurality of slaves are commonly used in many fields of technology. For example, such control systems may serve to control components of a mobile communication antenna. In this case, the master may execute the control of antennas and/or antenna line devices as slaves.

In many fields, the communication between master and slaves must, however, satisfy high demands on latencies. This is especially also the case with antenna systems. According to the prior art it was therefore necessary to position the master comparatively close to the slaves so as to observe the demanded latencies. Hence, it has been necessary up to now to arrange, e.g. in the case of mobile communication antenna systems, complicated master applications decentrally close to the antenna, e.g. in the area of the mobile communication base station. This makes it more difficult to centrally control a communication system, which comprises a plurality of antennas.

Therefore, it is the object of the present disclosure to provide a control system in the case of which the master need no longer be arranged close to the slaves.

The present disclosure comprises, according to a first aspect, a control system comprising a master, at least one slave, and a communication module which is arranged between the master and the at least one slave and through which the master and the at least one slave communicate, wherein the master sends control commands for controlling the at least one slave and said at least one slave responds to the control commands of the master, and wherein the communication module relays the respective control commands and responses. According to a first variant of the present disclosure, the master transmits to the communication module in one or a plurality of requests at least one control command and at least one associated timing requirement, which the communication module processes by relaying the at least one control command according to the at least one timing requirement to the at least one slave. According to a second variant of the first aspect, the communication module determines timing information concerning the communication with the at least one slave and sends said timing information to the master.

The first and second variants of the first aspect of the present disclosure can be used each individually and independently of one another. Optionally, however, they are used in combination.

Using timing requirements in accordance with the present disclosure, which are transmitted from the master to the communication module and which determine the time response of the latter, means that the only latencies which matter with respect to a correct execution of the communication between master and slaves in terms of time are the latencies between the communication module and the slaves, but no longer the latencies between the master and the communication module. Likewise, the transmission of timing information independently of possible latencies in the communication between the communication module and the master allows monitoring of the time response of the slaves. The master can thus be arranged remotely from the slaves and/or may be connected to the communication module via communication links with a non-defined or high latency.

In particular, the master may be connected to the communication module via a communication link with a higher and/or non-defined latency. As regards the time response of the system, it will in this case suffice when the communication module is connected to the at least one slave via a communication link with a lower and/or defined latency. The higher latency may be a first latency and the lower latency may be a second latency, where the first latency is higher than the second latency.

In addition, the master may communicate with the communication module via a network.

In the following, embodiments of a control system according to the first variant of the present disclosure will now be described.

According to a possible embodiment, a single request of the master may comprise at least one control command together with at least one associated timing requirement. For example, a request may here comprise two or more control commands together with an associated timing requirement. In particular, the request may comprise all the timing requirements associated with at least one control command and/or all the control commands associated with at least one timing requirement.

Alternatively, the at least one control command and the associated at least one timing requirement may be transmitted in separate requests from the master to the communication module. In addition, it is imaginable to transmit a plurality of control commands or a plurality of timing requirements in separate requests from the master to the communication module. The information transmitted in a request from the master according to a first embodiment is thus distributed to two or more requests.

Optionally, the master and the communication module each have a logic function allowing the master to signal and the communication module to recognize that the separate requests belong together. In particular, the requests may comprise link information and/or identification information, e.g. an ID, which signals to the communication module that control commands and/or timing requirements belonging to the separate requests are transmitted. Optionally, linked requests will not be further processed by the communication module until all the linked requests from the master have arrived.

According to one embodiment, the master sends in one or a plurality of requests at least two control commands and an associated timing requirement to the communication module, the communication module sending the two control commands successively according to the timing requirement to at least one slave. In particular, the communication module may send the two control commands successively to the at least one slave with a temporal distance corresponding to the timing requirement and/or in a temporal sequence corresponding to the timing requirement. In particular, a further request will thus no longer be necessary for sending the second control command, but the communication module will send the second control command automatically in accordance with the timing requirement. Thus, it is possible to send two control commands according to the timing requirement, independently of the latency between the master and the communication module.

Optionally, the communication module automatically guarantees that the timing requirement will be observed by transmitting the second control signal in good time (e.g., within a predetermined duration). The communication module can here evaluate the time for communication with the slave and transmit the control commands in accordance with the timing requirement.

According to a possible embodiment, the request or the plurality of requests comprises a first control command to a first slave, a second control command to a second slave, and the timing requirement, wherein, after having received the request or at least one and optionally all of the plurality of requests, the communication module sends the first control command to the first slave and the second control command to the second slave after a period of time corresponding to the timing requirement and/or in a temporal sequence corresponding to the timing requirement and/or on the basis of a condition corresponding to the timing requirement.

According to an alternative embodiment, the two control commands may, however, also serve to control a single slave.

In accordance with a possible embodiment of the present disclosure, the timing requirement concerns the temporal distance between the sending of two control commands by the communication module and/or the temporal distance between the reception of a response from a slave and the sending of a control command by the communication module.

In addition to requests which comprise at least one control command and at least one timing requirement or which are linked for transmitting at least one control command and at least one timing requirement, the master may also send requests to the communication module, which comprise only one control command but no timing requirement and which are not linked, said requests causing the communication module to relay the control command directly to the at least one slave.

In the following, embodiments of a control system according to the second variant of the present disclosure will be shown.

According to one embodiment of the second variant, the communication module determines the difference in time between the sending of a control command to a slave and the reception of a response, and sends it to the master.

Alternatively or additionally, the communication module may determine the transmission time when a control command is sent to a slave and/or the reception time of a response, and send it or them to the master.

Optionally, the communication module sends the timing information and in particular the difference in time, the transmission time, and/or the reception time together with the response of the slave to the master.

Embodiments of the present disclosure, which may be used for a control system according to the first variant as well as for a control system according to the second variant, will be described in the following.

Communication between the master and all the slaves connected to the master may take place such that only the master will be able to initiate communication, whereas the slaves wait to be addressed by the master.

The communication between the master and the slaves connected to the master may be serial communication.

According to a possible embodiment of the present disclosure, the communication module acknowledges the reception of one or of a plurality of requests and/or of a control command of the master by sending an acknowledge signal.

According to a possible embodiment of the present disclosure, the communication module sends a plurality of responses of at least one slave in common to the master. In particular, the communication module may collect a plurality of responses of at least one slave and send them optionally together with at least one timing information. In this case, the timing information will optionally relate to at least one of the responses.

According to an alternative embodiment of the present disclosure, the communication module sends a plurality of responses of at least one slave each individually to the master. In particular, the communication module may relay responses of the at least one slave as soon as they arrive. Optionally, the communication module sends each of the responses together with at least one timing information.

The present disclosure comprises according to a second, independent aspect a control system comprising at least one master, at least one slave, and a communication module which is arranged between the master and the at least one slave and through which the master and the at least one slave communicate, wherein the master sends control commands for controlling the at least one slave and said at least one slave responds to the control commands of the master, and wherein the communication module relays the respective control commands and responses. According to the present disclosure, the communication module has a polling mode in which it sends, at predetermined time intervals automatically and without being requested to do so by a master's request, polling commands to the at least one slave. The amount of data exchanged between the master and the communication module can be reduced in this way.

Such polling commands may e.g. be used for signaling to the slaves that the communication link is still active. Optionally, the slaves respond to a polling command with a polling response.

According to a possible embodiment of the present disclosure, not each polling response of a slave to a polling command is relayed to the master. Also this is a possibility of reducing the data volume.

In particular, only the polling response of a slave to the first or the last polling command of the communication module may be relayed to the master. Alternatively, a polling response may also be relayed, if a time criterion with respect to the last relayed polling response is fulfilled. For example, a polling response may be relayed, if a certain number of preceding polling responses has not been relayed and/or if no polling responses have been relayed for a certain period of time.

However, a status and/or alarm message sent by the slave in response to a polling command will optionally always be relayed to the master.

The polling mode can optionally be switched on and off by the master and/or the at least one slave. For example, the master and/or the at least one slave may be able to switch the polling mode on and/or off by sending a request and/or a control command and/or a response.

The polling function of the communication module according to the second aspect of the present disclosure may also be implemented independently of the timing requirements and the time evaluation according to the first aspect. Optionally, both aspects are, however, realized in combination.

Embodiments of all the aspects of the present disclosure will be described in the following.

The master may be a controller, e.g. a virtual controller. The slaves are optionally terminals.

The control commands and the responses with which the master and the slaves communicate may first be arbitrary information packets and/or parameters.

Communication between the master and the slave or slaves takes place optionally via a communication protocol, which defines the form and/or the content of the control commands and of the responses. The control commands may comprise a header and a body, the header optionally comprising at least addressing information for the addressed slave. The body may comprise one or a plurality of data arrays, which, depending on the respective control command, may have very different contents.

Optionally, the communication module identically relays, with respect to their information structure and their information content, the control commands comprised in a request. The communication module can thus have a very simple design, since it need not evaluate and/or understand the control commands, but it simply relays these commands. Furthermore, the communication protocol used for communication between master and slaves can be changed without any necessity of adapting the communication module.

For example, a request defines a frame in which the control command or control commands are comprised, which must therefore only be removed from the frame and relayed. Such a frame for a request, with which the master communicates with the communication module, may have a header and a body. The header optionally comprises at least addressing information for the addressed communication module, whereas the body comprises a plurality of data arrays comprising one or a plurality of control commands for relaying to the slave or slaves, and optionally one or a plurality of timing requirements.

A request may, however, also be distributed over a plurality of frames. For example, the respective control commands and timing requirements may be transmitted in separate frames. In this case, it is, however, necessary that assignment information between the control commands and the timing requirements is transmitted.

Optionally, also the responses of the slaves are only inserted in a larger response frame in the communication module and relayed to the master. Such a frame for a response, with which the communication module answers the master, may comprise a header and a body. The header optionally comprises at least addressing information for the master, whereas the body comprises a plurality of data arrays comprising one or a plurality of responses of the slave or slaves and optionally one or a plurality of items of timing information. Also in this case, a plurality of frames may, however, be used for a response.

The communication module may optionally transmit the control commands and/or the responses comprised in a request via some other physical layer and/or some other protocol.

Optionally, the communication module is transparent for the connected slaves, e.g. communication takes place for the slaves in exactly the same way as if they communicated directly with the master. The communication module can thus be used without any necessity of modifying the slaves, and it can replace e.g. a master installed on site.

According to the present disclosure, the communication protocol used for communication between the master and the communication module may differ from that used for communication between master and slave(s). The communication between master and slave may, however, also take place on the basis of a master-slave relationship, in which the communication module is the slave.

According to one embodiment of the present disclosure, communication between the communication module and the master takes place via an Internet protocol.

Control systems according to the present disclosure are adapted for use in many fields.

For example, one or a plurality of the following communication protocols and techniques are imaginable as a communication protocol for communication between the master and the communication module and/or for communication between master and slaves: Real Time Protocol (RTP), Serial Port Extender via LAN/WAN (IP), IPv4, IPv6, UART, standard communication protocols (http(s), REST, MQTT, etc.), NAT, etc.

Optionally, the control system according to the present disclosure is used for controlling communication systems.

According to one embodiment of the present disclosure, the slave is therefore a control component of a communication system.

In particular, the slave may be an antenna line device and/or a control component of a mobile communication antenna, in particular a mobile communication antenna for operation at a mobile communication base station.

For example, the slave may be an antenna control unit as an antenna line device, especially an antenna control unit for controlling the orientation of the antenna, in particular for adjusting the tilt angle of a group antenna.

Furthermore, the slave may also be a further antenna line device, e.g. an amplifier.

A plurality of slaves may here communicate via a communication module with a master, in particular a plurality of control components of the antennas of a mobile communication base station.

According to a possible embodiment, the communication module is integrated in the base station.

Furthermore, the communication module may communicate via the high-frequency signal lines with the control component, in particular via data signals which are superimposed on the high-frequency signals.

According to one embodiment of the present disclosure, communication between master and slave may take place according to the AISG standard, and/or the control commands and/or the responses may correspond to the AISG standard. The AISG standard is here in particular the AISG standard 1.0 or higher. The term AISG comprises, within the framework of the present disclosure, each protocol which originated from the first AISG standard. Hence, the term AISG especially comprises AISG1.0, AISG1.1, AISG2.0 and 3GPP TS 25.466.

According to an alternative embodiment of the present disclosure, the slave is, however, a control component of a satellite receiver and/or a satellite antenna.

According to one embodiment of the present disclosure, the control system according to the present disclosure is used for controlling a communication system comprising a plurality of slaves that are arranged remotely from one another, the control of the communication system being executed centrally in that one or a plurality of centrally arranged masters communicate with the slaves via respective communication modules arranged in the area of the slaves. As described above, the communication system may here be in particular a mobile communication system.

The present disclosure additionally comprises a communication module, which is adapted to be arranged between a master and at least one slave and which relays control commands of the master to the slave and responses of the slave to the master. The communication module is characterized in that, according to a first variant of the first aspect, it processes one or a plurality of requests of the master, with which the master transmits at least one control command and at least one timing requirement, by sending the at least one control command according to the at least one timing requirement to the at least one slave, and in that, according to a second variant of the first aspect, it determines timing information with respect to communication with the at least one slave, and sends said timing information to the master. Optionally, the two variants are again combined with one another. According to the second aspect, the communication module has a polling mode in which it sends, at predetermined time intervals automatically and without being requested to do so by a master's request, polling commands to the at least one slave. Optionally, the two aspects are realized in combination.

Optionally, the communication module is configured in the manner and operates in the manner that has already been described hereinbefore in connection with the control system according to the present disclosure, and/or it is used for configuring such a control system.

The present disclosure additionally comprises a method of controlling at least one slave via a master, the master and the at least one slave having arranged between them a communication module through which the master and the at least one slave communicate, wherein the master sends control commands for controlling the at least one slave and the at least one slave responds to the master's control commands, wherein the communication module relays the respective control commands and the responses. According to a first variant of the first aspect, the master transmits to the communication module in one or a plurality of requests at least one control command and an associated timing requirement, wherein the communication module processes the request or the plurality of requests by sending the at least one control command according to the at least one timing requirement to the at least one slave. According to a second variant of the first aspect, the communication module determines timing information with respect to communication with the at least one slave, and sends said timing information to the master. Optionally, the two variants are again combined with one another. According to the second aspect, the communication module sends, in a polling mode, polling commands to the at least one slave at predetermined time intervals automatically and without being requested to do so by a master's request. Optionally, the two aspects are realized in combination.

Optionally, the method is executed in the manner that has already been described hereinbefore in connection with the control system according to the present disclosure, and/or it is used for operating such a control system.

The present disclosure will now be described in more detail making reference to embodiments and drawings.

DETAILED DESCRIPTION

The present disclosure relates to the control of terminals by a controller. The controller represents the master, which is the only component having the right to access the common resource, e.g. to initiate communication, without having been requested to do so. The terminal or terminals are slaves that are not able to access the common resource on their own accord and that can therefore not initiate communication. In fact, the slaves have to wait until they get asked by the master.

Figure 1:
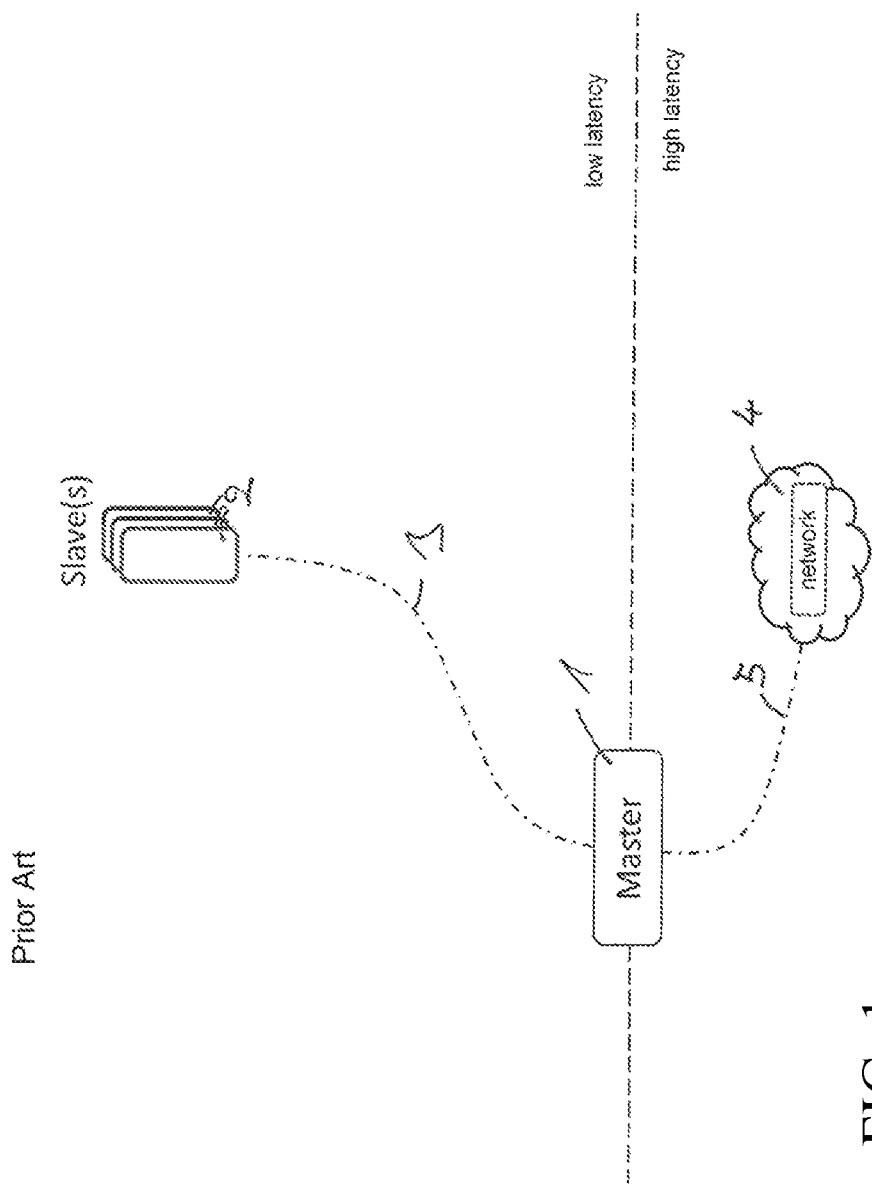
FIG. 1 shows a control system according to the prior art.

FIG. 1 shows an embodiment of such a control system according to the prior art. The master 1 is connected to one or a plurality of slaves 2 via a communication link 3. The master 1, in turn, may be connected via a communication link 5 to superordinate control entities, e.g. via a network 4.

Figure 2:
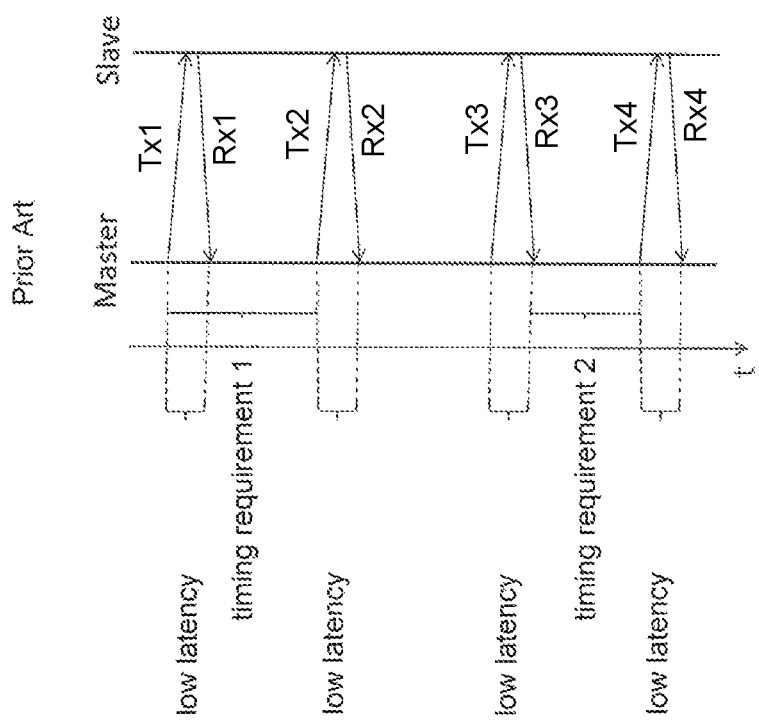
FIG. 2 shows a communication diagram depicting typical timing requirements for communication according to the prior art.

Communication between master and slave may be subject to certain timing requirements. Such timing requirements may either result from the concrete control situation or from the underlying communication standard. FIG. 2 shows two typical timing requirements for the temporal sequence of two control signals Tx1 and Tx2 or Tx3 and Tx4, which are sent from the master to a slave. Timing requirement 1 is the temporal distance between the sending of the first control command Tx1 and the sending of the second control command Tx2. Timing requirement 2 is the temporal distance between the reception of the response Rx3 to a first control command Tx3 and the sending of the second control command Tx4.

According to the prior art, the master determines here the timing of the communication, e.g. the timing of the sending of the control signals Tx. In addition, the master normally measures the timing of the slaves' responses Rx received in response to the control commands Tx, and evaluates them.

The latencies in communication between master and slave directly influence the measured timing and determine whether timing requirements can be complied with in the communication. Hence, the communication link 3 between master and slaves must have a low or defined latency.

However, the communication link 5 between the master and the superordinate control entities normally has a high or non-defined latency, in particular if said communication link is a complex network infrastructure.

If communication is established by complex network infrastructures, latencies are often long or at least unknown. In this case, latencies normally amount to approx. 5 microseconds per kilometer or 5 milliseconds per 1,000 kilometers, so that the latency across a network will normally be longer than 1 millisecond and/or will normally depend on the unknown path which a message takes through the network. Such long or unknown latencies especially have an effect on data packets which must arrive at the terminals with a certain synchronicity, e.g. on data packets which, for example, must have been communicated to the terminal within a specific time interval.

Hence, such latencies limit the spatial distance between the controller operating as a master and the terminals operating as slaves. According to the prior art, the controllers were therefore in particular locally installed and operated as remote controllers and were only controlled and monitored by central control elements The remote controllers determine, measure, monitor and evaluate the timing locally, as described above.

However, functions which have hitherto been executed by discrete devices are nowadays increasingly carried out centrally by means of server technologies. This technology offers distinct advantages to the user, in particular with respect to scalability, maintenance, monitoring, back-up and restore, costs as well as complexity.

In principle, also the above-mentioned controllers could therefore be realized by means of server technologies, so that a controller would be replaced by a virtual controller. However, the terminals used will thus lose their nearness in space to the controllers and, consequently, the low latency. It follows that, in the case of known solutions, the realization of controllers by means of server technologies is limited or blocked by the problems arising from long or unknown latencies.

The solution according to the present disclosure described hereinafter will, however, eliminate the influence of network- and medium-given latencies on the communication to a large extent.

Figure 3:
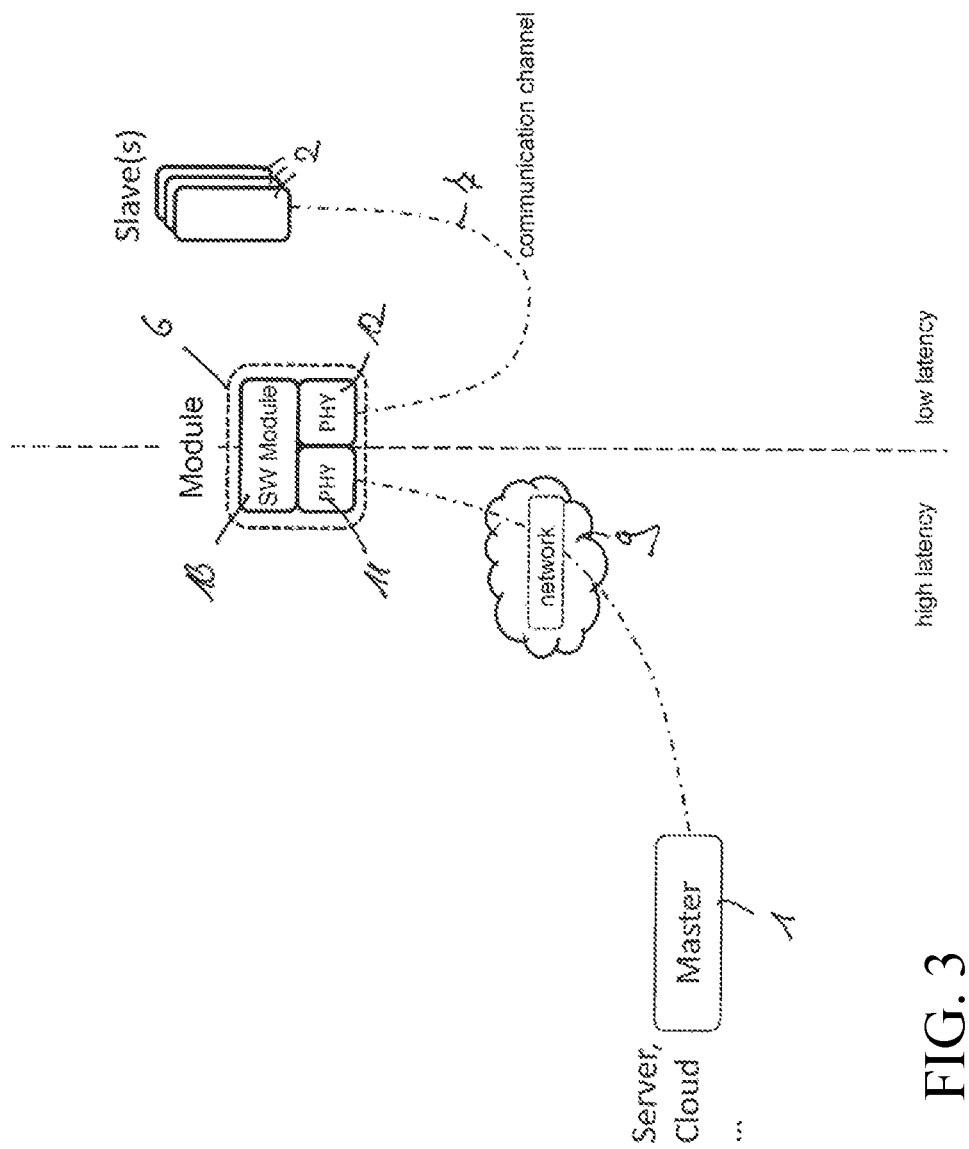
FIG. 3 shows a first embodiment of a control system according to the present disclosure comprising an embodiment of a communication module according to the present disclosure.
Figure 4:
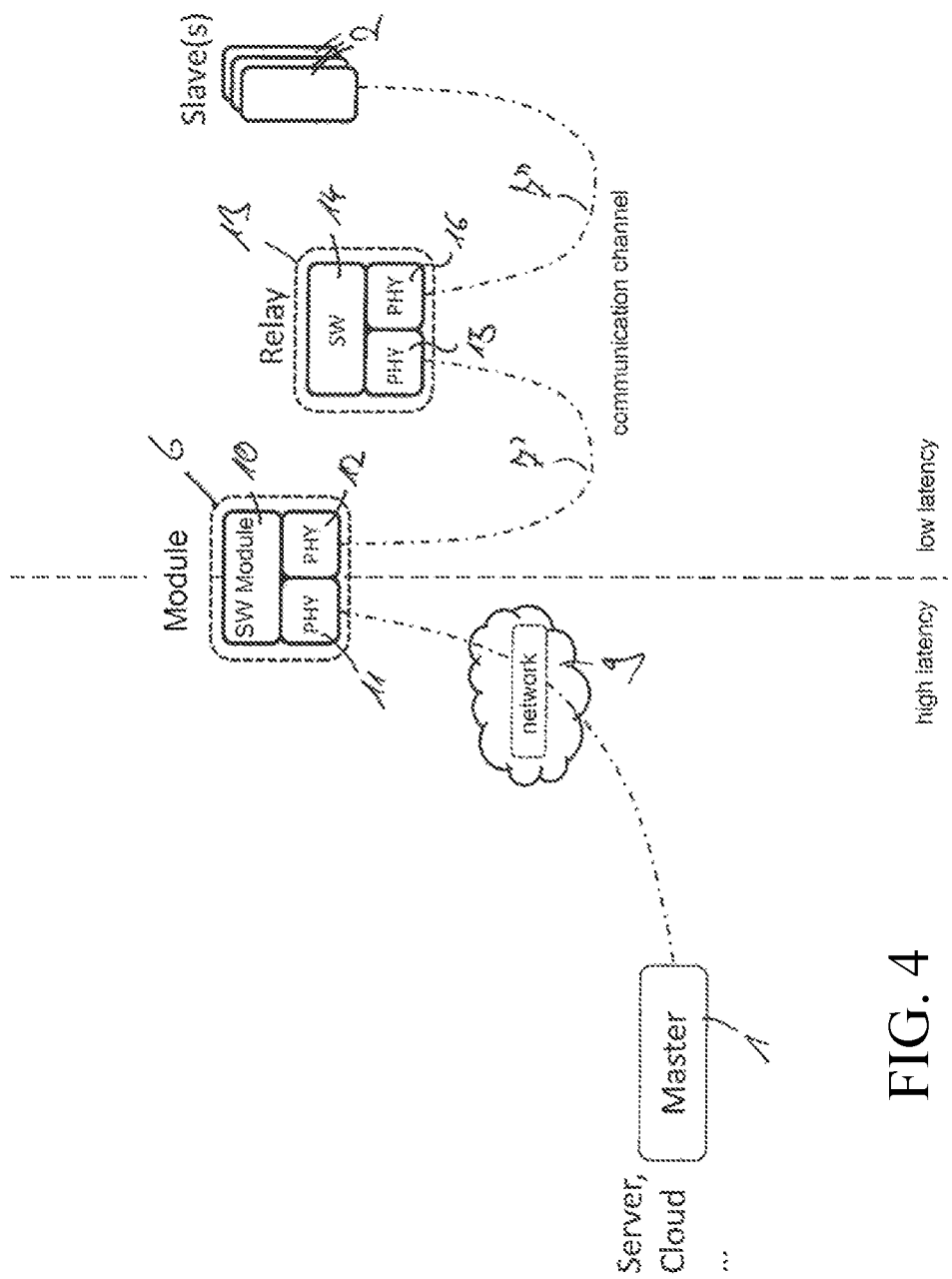
FIG. 4 shows a second embodiment of a control system according to the present disclosure, in which a relay is additionally arranged between the module and the slaves.

FIGS. 3 and 4 show two embodiments of a control system according to the present disclosure, comprising a master 1, a network 9, a communication module 6, and a slave 2 or slaves 2. The master 1 communicates with said one or said plurality of slaves 2 via a communication module 6. The module 6 connected to the master 1 via a network 9 transfers the data packets, which are directed from the master 1 to the slave 2, to said slave, receives from the latter the respective response and sends this response via the network 9 to the master 1.

Between the module 6 and the slave 2 only low or defined latencies are allowed. For example, the maximum latencies allowed between the module 6 and the slave 2 are smaller than 20 milliseconds, and optionally smaller than 10 milliseconds. To this end, the communication module 6 is normally connected to said one or said plurality of slaves 2 via a direct communication link 7 with a low or defined latency. The communication module 6 is optionally arranged in spatial proximity to (e.g., within a threshold distance from) the slaves for this purpose.

The master 1 acting as a controller may, however, also be connected to the communication module 6 via complex networks 9 with a high or unknown latency. In particular, the master 1 may here be implemented centrally in a computing center as a virtual controller. There, it may be mapped e.g. to (virtual) servers, e.g. via clouds, vRAN. In particular, communication between the master 1 and the communication module 6 may take place via an Internet protocol.

In some examples, master 1 is or includes a microcontroller which includes a processor and non-transitory memory, the non-transitory memory having instructions stored therein for carrying out the various control actions described herein, including control actions associated with the communication diagrams shown in the figures. For example, the instructions may include instructions to transmit to the communication module in one or a plurality of requests at least one control command and an associated timing requirement.

In some examples, similar to master 1, communication module 6 is or includes a microcontroller, the microcontroller including a processor and non-transitory memory, the non-transitory memory having instructions stored therein for carrying out the various control actions described herein, including control actions associated with the communication diagrams shown in the figures. For example, the instructions may include instructions to relay control commands of the master to the slave and responses of the slave to the master, process one or a plurality of requests of the master, etc.

The communication module 6 has a first physical interface 11 through which it communicates with the master 1 by means of a specific protocol, and a second physical interface 12 through which it communicates with the slaves by means of some other protocol. Furthermore, the communication module 6 comprises a software module 10, which implements the functionalities described hereinafter.

In the embodiment shown in FIG. 4, the communication link additionally comprises a relay 13 between the communication module 6 and the one or the plurality of slaves 2. Here, it will be necessary to take care that the latency via the communication link 7' between the module 6 and the relay 13, and via the communication link 7" between the relay 13 and the slaves 2, satisfies the demands on the low or defined latency. The optionally provided relay 13 has a design similar to that of the communication module, including a software module 14, first physical interface 15, and second physical interface 16, the software module 14 relaying, however, only the mutual communication.

Also the communication module 6 according to the present disclosure relays the mutual communication between the master and the slave or slaves. Communication between master and slaves is here effected through control commands directed from the master to the slaves and responses to the control commands directed from the slaves to the master. Control commands and responses within the meaning of the present disclosure may be arbitrary information packets that are exchanged between the master and the slaves in accordance with the respective protocol.

According to a first aspect of the present disclosure, the communication module 6 additionally allows the master to transmit, with a request or a plurality of requests to the communication module, in addition to one or a plurality of control commands for the slave or slaves also one or a plurality of timing requirements to the communication module. The communication module then relays the control command or commands to the slave or slaves 2 according to the timing requirement. The master's requests may here be transmitted e.g. by means of http(s) and/or WebSockets.

In the present embodiment, the controller thus provides the communication module with all the parameters and data of communication between master and slaves together with timing requirements. The timing requirements then determine the temporal sequence and/or transfer of information at the communication module. All the necessary parameters and information for communication with the terminals, including the timing parameters, are therefore communicated, e.g. from the cloud, to the communication module by the controller working as a master. The timing parameters are then processed in the communication module, which carries out communication with the terminals on site. Hence, the master still determines the timing of communication with the slaves, but no longer only directly by sending the control commands, but by transmitting the timing requirements to the communication module.

According to a second aspect of the present disclosure, the communication module measures the timing of communication with the slaves and sends this timing information to the master. Optionally, the result of communication with the slaves, including ascertained timing values, is communicated by the communication module to the controller. The controller will thus be able to centrally evaluate the communication result, including the timing result, relayed by the communication module.

In the present embodiment, the information transmitted between master and slaves is not processed in the communication module, but this information is only relayed by the communication module and optionally transferred to some other physical interface. Therefore, the communication module only evaluates the timing requirements and controls communication with the terminals on the basis of this timing requirement, and/or measures the timing of communication with the terminals and transmits the results to the master.

Figure 5A:
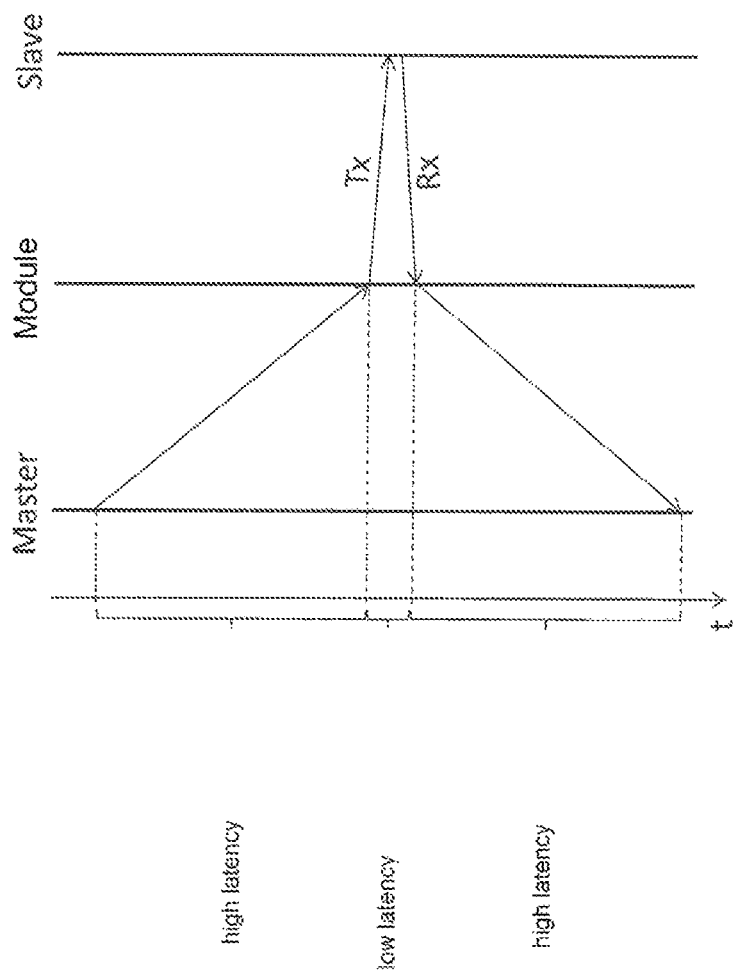
FIG. 5A shows a communication diagram depicting a typical communication process in a control system according to the present disclosure.
Figure 5B:
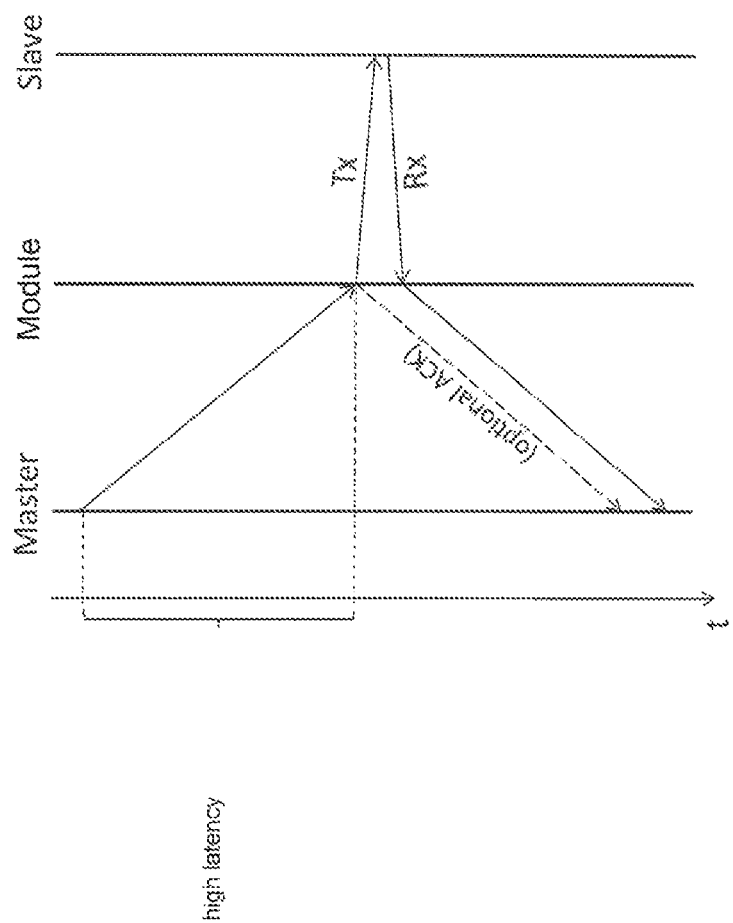
FIG. 5B shows a communication diagram depicting the communication process shown in FIG. 5A, in a variant in which the communication module acknowledges the reception of a request.

FIGS. 5A and 5B show, for illustrating the second aspect of the present disclosure, a communication process between the master, the communication module and the slave. The communication module receives via links of high or unknown latency a data packet intended for the slave, forwards said data packet to the slave and receives the slave's response, which, in turn, is forwarded to the master via links of high or unknown latency. The module ascertains here the time required for communication between module and slave and communicates this time to the master, the master being thus able to remotely monitor whether the demanded timing is observed. The high latencies of communication between the communication module and the master have therefore no effect on the monitoring of the timing by the master, since the timing information is already ascertained in the module.

Such an embodiment will also be of advantage in the event that the requests of the master do not comprise any timing requirements and that only the communication module ascertains timing information for communication between module and slave and relays said information to the master.

For communication between the communication module and the slave the latency is, however, low, since the module is arranged close to the slaves.

In FIGS. 5A and 5B a respective request is sent from the master to the module, the control command Tx comprised therein being transmitted to the slave, which answers with the response Rx. The response Rx is then relayed from the communication module to the master. In the communication according to FIG. 5b, an acknowledge signal is additionally sent back to the master upon reception of a request from the master.

According to the first aspect of the present disclosure, the requests, which the master sends to the module, may comprise, in addition to one or a plurality of control commands, timing requirements for communication between module and slave. This is exemplarily illustrated in FIGS. 6A and 6B. In the embodiments shown there, a request may comprise two or a plurality of information packets intended for the slave or slaves, which information packets are to be communicated by the communication module to the terminal according to one or a plurality of timing requirements that are also transmitted together with the request. In particular, the information packets may, satisfying the timing requirement, be relayed in a predetermined temporal sequence to the slaves. Also in this case, communication between the controller and the module may take place with or without an acknowledge signal.

Figure 6A:
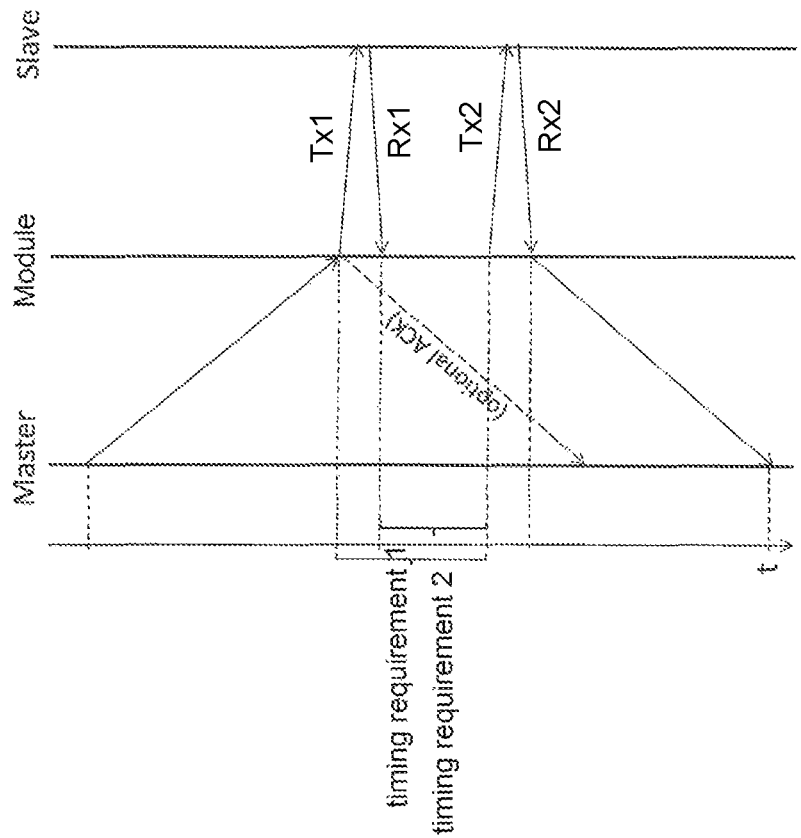
FIG. 6A shows a communication diagram depicting the processing of two control commands according to at least one timing requirement in accordance with the present disclosure, the slave's responses to the control commands being here collected and transmitted in common.
Figure 6B:
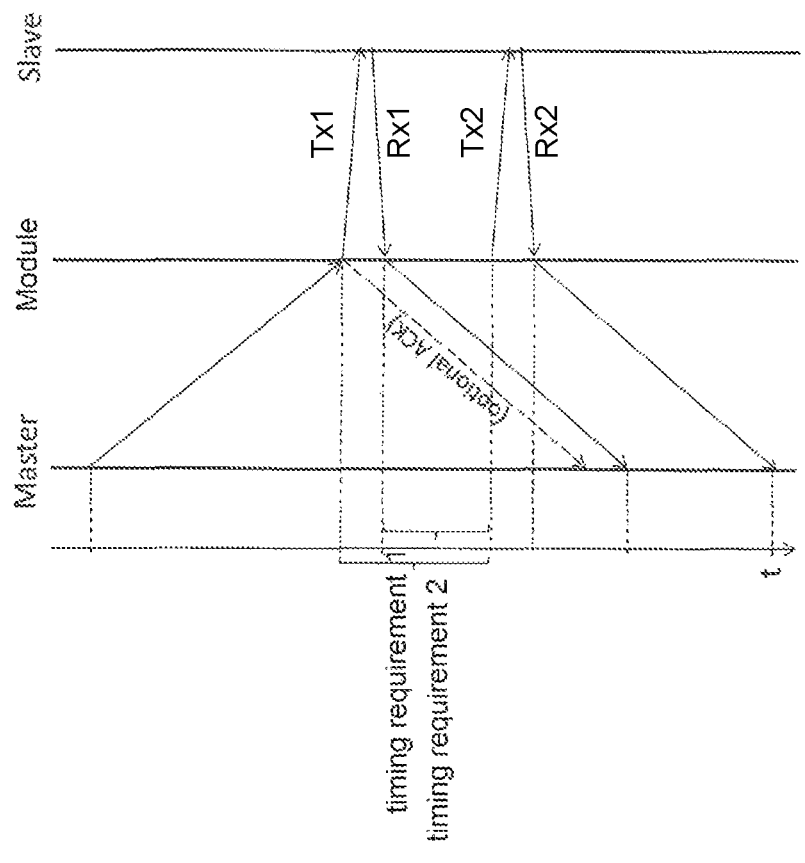
FIG. 6B shows the communication diagram shown in FIG. 6A, the slave's responses to control commands being transmitted separately.

The communication sequence shown in FIGS. 6A and 6B corresponds to the communication sequence according to the prior art shown in FIG. 2. Also in this case, there is a timing requirement 1 between the sending of the first control command $Tx_1$ and of the second control command $Tx_2$, and a timing requirement 2 between the reception of the response $Rx_1$ to the first control command and the sending of the second control command $Tx_2$. Hence, the request transmitted from master to module comprises, in addition to the two control commands $Tx_1$ and $Tx_2$, also the first or the second timing requirement. The communication module then sends the two control commands automatically to the slave with due regard to the timing requirement or timing requirements. In particular, a further request of the master is not necessary for sending the second control command $Tx_2$.

In the embodiment shown in FIG. 6A, the request of the master is answered only with a response through the communication module. To this end, the communication module collects the slave's responses, here $Rx_1$ and $Rx_2$, to the control commands $Tx_1$ and $Tx_2$, and transmits them collectedly in a response (optionally together with the timing information according to the second aspect). It follows that, in the embodiment shown in FIG. 6A, a response, e.g. an answer to the request, is sent to the controller only at the end of the request-initiated temporal sequence of the communication between module and terminal, said response comprising the responses of the slave and optionally all the items of information concerning the history over time of communication between module and terminal.

In the communication shown in FIG. 6B, however, a response is sent to the controller also within the temporal sequence of the request-initiated communication between the communication module and the terminal. This response comprises e.g. the first response $Rx_1$ of the slave, optionally together with the associated timing information.

It follows that, in the communication shown in FIGS. 6A and 6B, the communication module receives within a data packet two data packets intended for the slave via links of high or unknown latency, passes these data packets on to the slave in accordance with timing requirement 1 or timing requirement 2 transmitted together with the data packets, and receives the slave's responses, which are sent to the master either in common or separately via links of unknown latency.

The timing requirements can therefore be observed in spite of the high latency of communication between the communication module and the master. Such an embodiment will also be of advantage, if the communication module neither ascertains nor transmits any timing information for communication between module and slave.

According to the present and according to all the following embodiments of the first aspect, all the associated control commands and timing requirements are jointly transmitted from the master to the slaves in one request. In an alternative embodiment, the master's request may, however, also be distributed to two or more requests. In particular, the two or more information packets intended for the slave or slaves and the one or more timing requirements may also be distributed to two or more requests. In this case, the associated requests should be linked. For example, the master may first send the control command to the communication module and subsequently, in a second ticket, the timing requirement (or vice versa) and give the communication module the possibility of linking (e.g. through ID in the ticket). In this case, further processing of the request in the communication module will not take place until both items of information have arrived from the master.

Furthermore, also within the framework of the first aspect, the master has, of course, the possibility of transmitting to the communication module in a request only one control command for direct relaying to the slave or slaves. In addition, a request need not necessarily comprise a timing requirement.

Furthermore, within the framework of the second aspect, it is not necessary that the communication module continuously ascertains and transmits the timing information. For example, the communication module may ascertain the timing information only if the request comprises a timing requirement and/or a respective command to ascertain timing information. In an alternative embodiment, the communication module may, however, ascertain timing information in the case of each communication with the slave, and transmit this information to the master.

Optionally, both aspects are realized in combination within the scope of the present disclosure. In this case, the master has the possibility of transmitting, within one or a plurality of requests, timing requirements together with data packets intended for the slave as well as receiving and evaluating timing information, which concerns the communication between module and slave and which is ascertained by the communication module.

The control system according to the present disclosure may be used in arbitrary fields of use. One exemplary use is, however, the control of a communication system and, in particular, the control of antenna components of mobile communication antennas of a mobile communication base station. The slaves controlled as terminals are here in particular antenna line devices and/or the antenna control unit. The antenna control unit may comprise in particular a Remote Electrical Tilt (RET) through which the radiation pattern of a group antenna is adjusted. As a communication standard for communication with the terminals, e.g. 3GPP and/or AISG may be used. The terminals can be controlled and monitored via the control system by a central control element, such as an NEM, working as a master.

Figure 7:
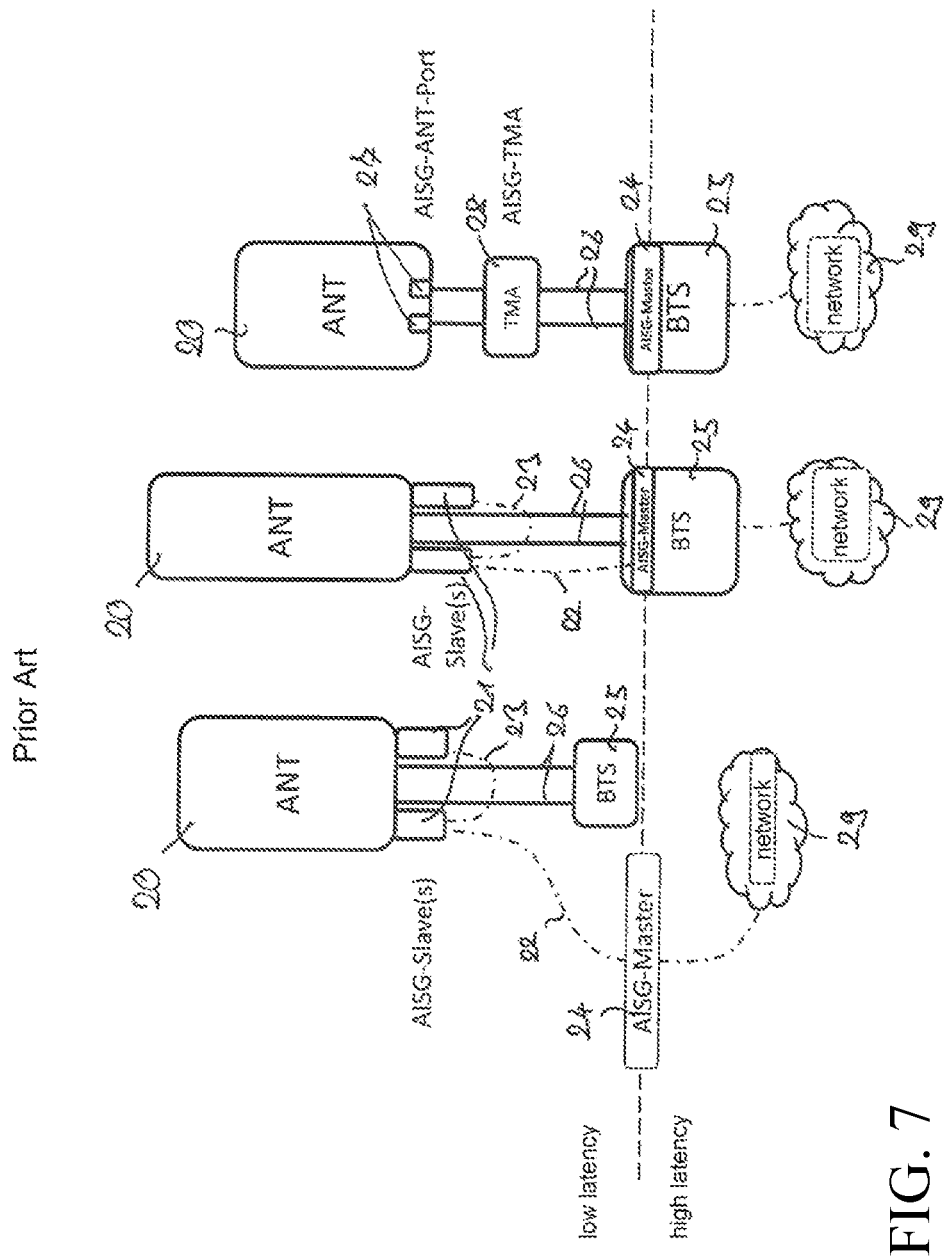
FIG. 7 shows three variants of control systems for controlling components of an antenna of a mobile communication base station according to the prior art.

FIG. 7 shows, side by side, three alternative architectures for controlling antenna components according to the prior art. In each of these alternatives, a mobile communication antenna 20 is provided, which is connected to a base station 25 via high-frequency lines 26 and has signals supplied thereto via the latter. In the vicinity of (e.g., within a threshold distance from) the mobile communication base station and antenna, respectively, a master 24 is provided, which controls the antenna components. Communication between master 24 and slaves 21 takes here place via AISG and/or 3GPP. The master 24, in turn, can be controlled via a network 29.

Within the framework of the present disclosure, the term AISG is representative for all the different protocol versions which originated from the first AISG standard. These are, among others, AISG1.0, AISG1.1, AISG2.0 and 3GPP TS 25.466.

In the left and in the central embodiment, the respective slaves 21 are RETs, which are arranged on the antenna. In particular, these RETs are provided with a motor by means of which one or a plurality of phase shifters of the antenna can be adjusted. Communication between the slaves and the master takes here place via separate control lines 22 and 23. In the left embodiment, the master is configured separately from the base station 25, in the central embodiment it is integrated in the base station 25.

In the embodiment shown on the right hand side, the master 24 is also integrated in the base station 25 and communicates with the antenna components via the high-frequency lines 26. The two antenna ports 27 are here provided with communication interfaces through which the communication signals are relayed to an internal antenna control unit consisting again of an RET by way of example. In the embodiment shown on the right hand side, the high-frequency line has additionally integrated therein an amplifier 28, which can also be addressed as a slave and which, apart from that, relays the communication signals to the antenna control unit.

Figure 8:
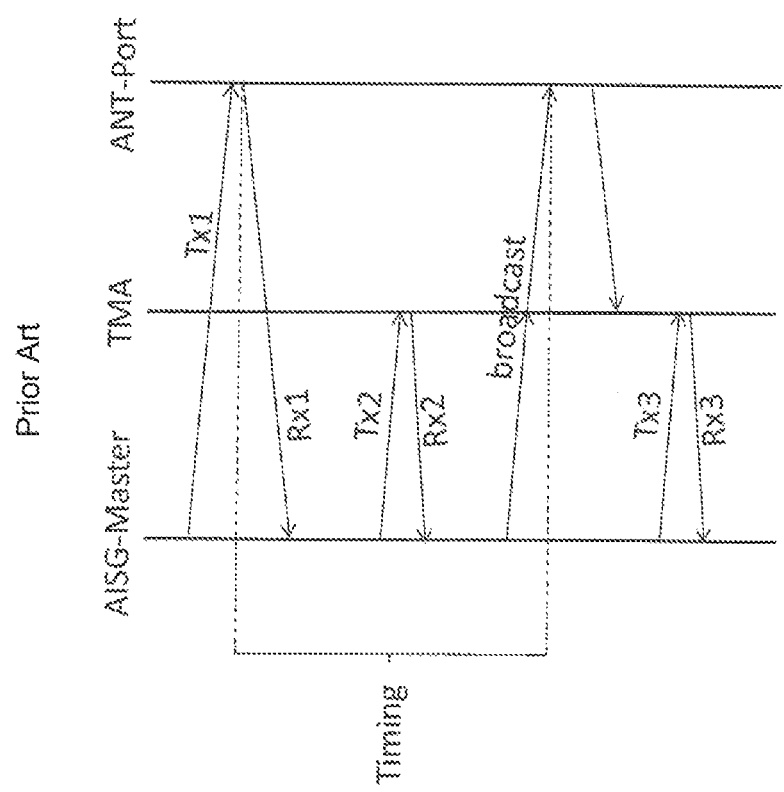
FIG. 8 shows a typical sequence of control commands with a timing requirement according to the prior art.

FIG. 8 shows a typical communication history in the case of the prior art embodiment shown on the right hand side of FIG. 7. The master sends here a first control command $Tx_1$ to the antenna control unit, which answers with a response $Rx_1$. Subsequently, the master sends a second control command $Tx_2$ to the amplifier, which answers with a response $Rx_2$. Subsequently, the master sends a broadcasting signal to all the connected slaves. A timing requirement exists here between the arrival of the first transmit signal $Tx_1$ and of the broadcasting signal at the antenna control unit. According to the prior art, this timing requirement is observed by arranging the master, which acts as a controller, in the area of the mobile communication base station.

All the prior art embodiments shown in FIG. 7 may also be configured as a control system according to the present disclosure by replacing the AISG master 24 depicted in FIG. 7 by a communication module according to the present disclosure, which is arranged at the same place and connected in the same way, and by transferring the functionality of the master e.g. to the network 29.

Figure 9:
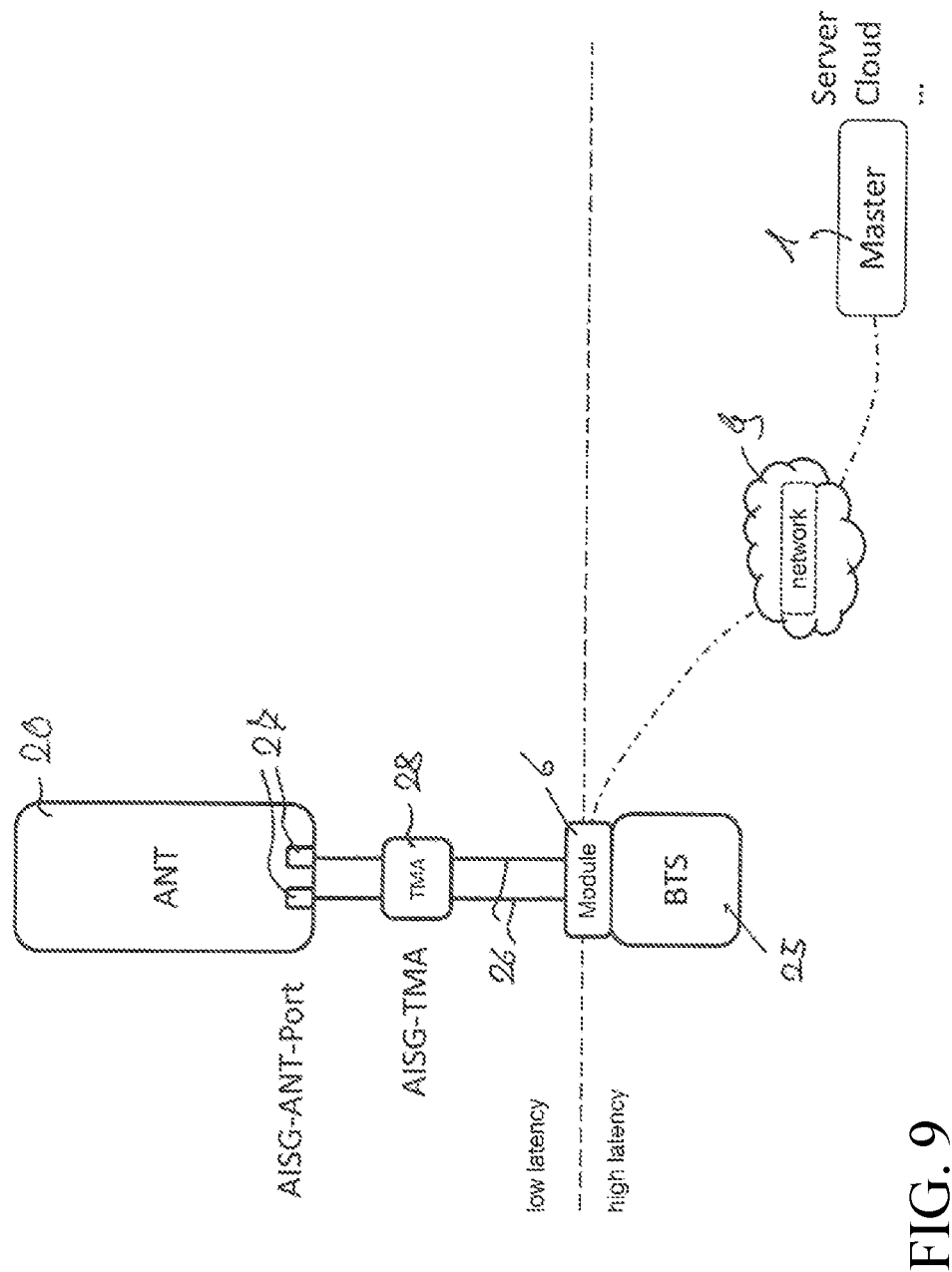
FIG. 9 shows an embodiment of a control system according to the present disclosure for controlling antenna components of a mobile communication base station according to the present disclosure.

FIG. 9 shows such an embodiment of the present disclosure whose basic design essentially corresponds to that of the embodiment shown on the right hand side of FIG. 7. The antenna 20 is here connected to the mobile communication base station 25 via the high-frequency lines 26. The antenna 20 comprises one or a plurality of AISG ports 27, which guarantee AISG communication with the antenna control unit. Furthermore, an amplifier 28 is provided in the high-frequency lines 26 between the base station 25 and the antenna 20, also said amplifier 28 having an AISG functionality.

The antenna control unit may in particular be an RET. If necessary, the antenna control unit may also send antenna data and/or read data from sensors, which are arranged in the area of the antenna, and send these data.

According to the present disclosure, a communication module 6 is either integrated in the base station 25 or accesses the high-frequency lines 26. As has been described hereinbefore, the communication module 6 transparently relays the AISG communication between the master and the antenna control unit to the antenna 25 and/or the amplifier 28. In the present embodiment, this is done via the high-frequency lines.

Furthermore, the communication module 6 communicates via a network 9 with the master 1, which is implemented as a virtual controller e.g. via a server cloud. Communication between the module 6 and the master 1 may, in a possible embodiment, take place e.g. via a wireless mobile radio connection.

In the following, embodiments for communication between the master 1, the module 6 and the amplifier 28 or the antenna control unit as a slave will be shown. The communication shown there is independent of the communication links shown concretely in FIG. 9.

Figure 10A:
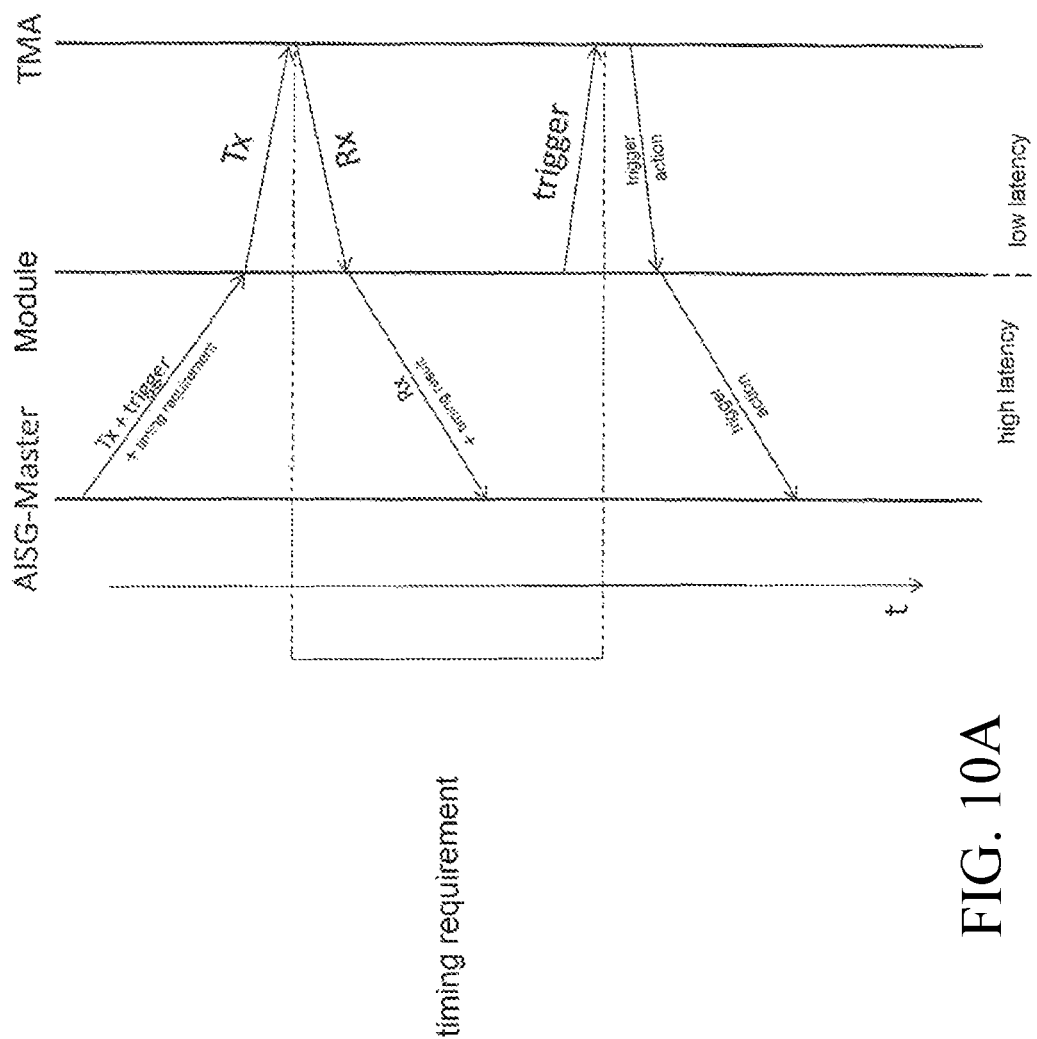
FIG. 10A shows a communication diagram showing the transmission and the processing of a request according to the present disclosure.

FIG. 10A shows an example for communication between the AISG master 1, the communication module 6 and the amplifier 28 which exemplarily represents the slave.

The request from master to communication module comprises two control commands "Tx" as well as "trigger", which are intended for the slave, as well as a timing requirement. After having received the request, the communication module first relays the first control command Tx to the slave, which answers with a response Rx. This response Rx is relayed by the communication module to the AISG master together with timing information for communication between module and slave. Furthermore, the trigger signal, which is also comprised in the request, is transmitted from the communication module to the slave in accordance with the timing requirement. The timing requirement concerns here the period of time between the reception of the first control command Tx at the slave and the reception of the trigger signal at the slave. The communication module will automatically guarantee that the timing requirement is observed by transmitting the trigger signal in good time (e.g., within a threshold time period). The communication module can here evaluate the time for communication with the slave and transmit the control commands in accordance with the timing requirement.

Figure 10B:
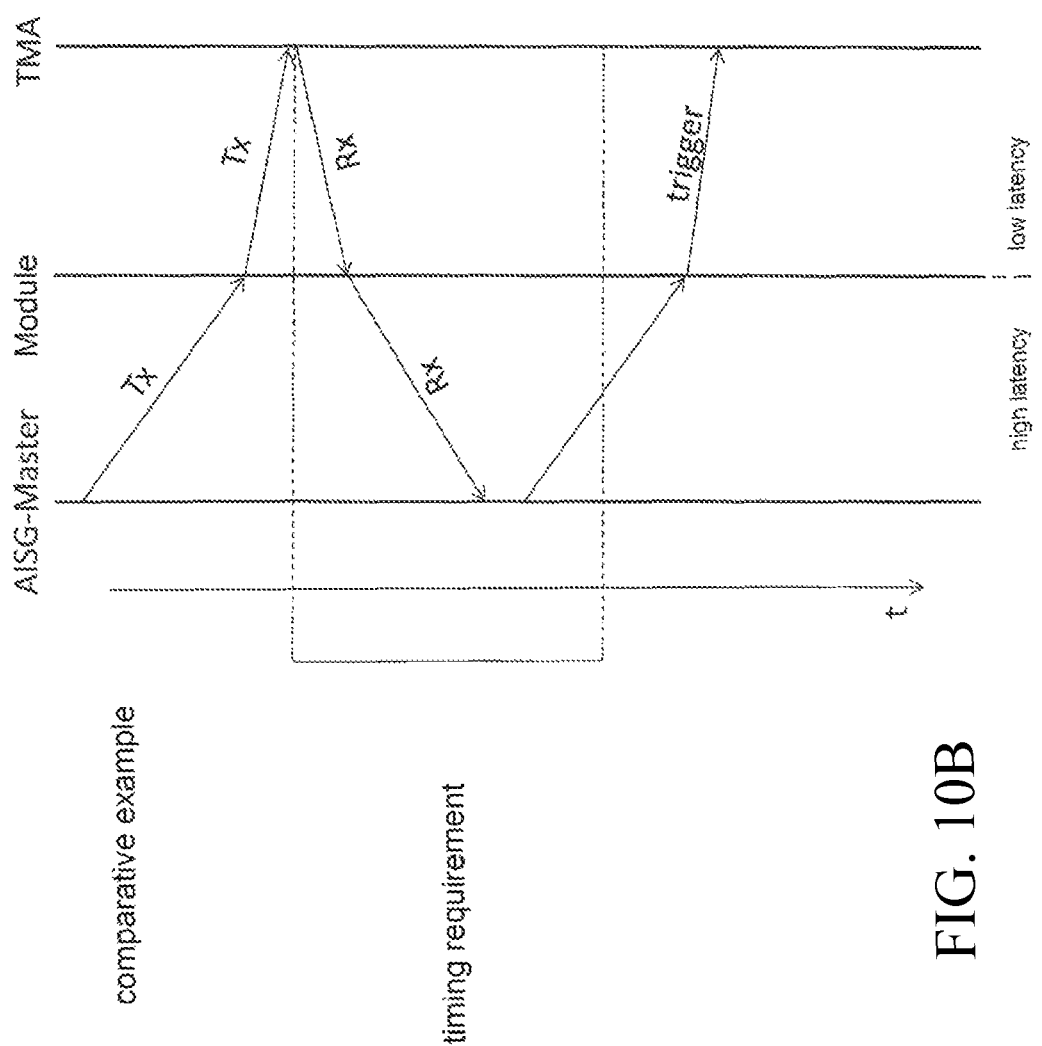
FIG. 10B shows a comparative example, which illustrates a comparable processing without the functionality of the communication module according to the present disclosure, and in which the timing requirement cannot be observed.

FIG. 10B shows here a comparative example, which illustrates the sequences of operations over time in the event that the communication module does not support any sequences according to the present disclosure and that all the data packets thus have to be sent individually from the AISG master in individual requests. The AISG master sends here individual data packets to the module, which sends these data packets to the AISG slaves. In the present example, the data packets Tx and "trigger" should be communicated to the slave within a certain period of time, but due to the high latencies this cannot be done in this case.

Also FIG. 11A shows again the flow of a communication according to the present disclosure, the communication corresponding to the flow according to the prior art shown in FIG. 8. The AISG master sends here in a request three data packets and the timing requirement to the communication module, which sends them in the predetermined temporal sequence to the two different slaves (TMA and ANT-Port in the depicted example). The data packets $Tx_1$, $Tx_2$, and "trigger" must be communicated to the antenna port within a certain period of time. The transmission of the timing requirement to the communication module and the transfer of the timing requirement by the communication module as well as the direct connection between the communication module and the AISG slaves allows observance of the high latency demands on communication with the slaves and, consequently, it allows observance of the timing requirement. The latencies in communication between the remote AISG master and the locally arranged communication module have, however, no influence on the observance of the timing requirement.

Figure 11A:
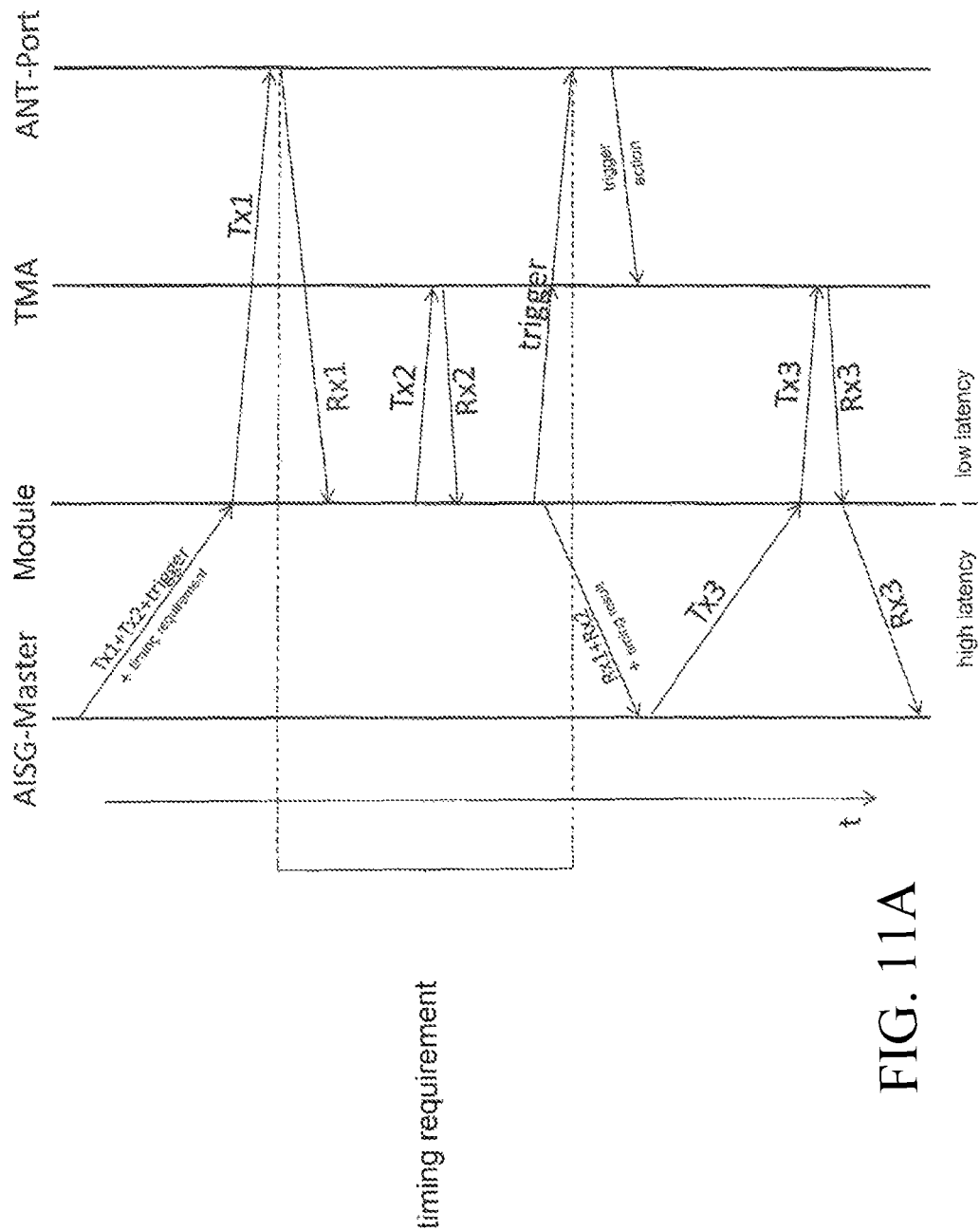
FIG. 11A shows a communication diagram illustrating a second example for a request and the processing of the latter according to the present disclosure.

In the embodiment shown in FIG. 11A, a response is sent to the AISG master, after the trigger signal has been transmitted and the request has consequently been processed, said response comprising the two responses $Rx_1$ and $Rx_2$ of the two slaves as well as the associated timing information. A further request of the AISG master follows, but this request only comprises the data packet $Tx_3$ intended for the slave TMA, without any timing requirement.

Figure 11B:
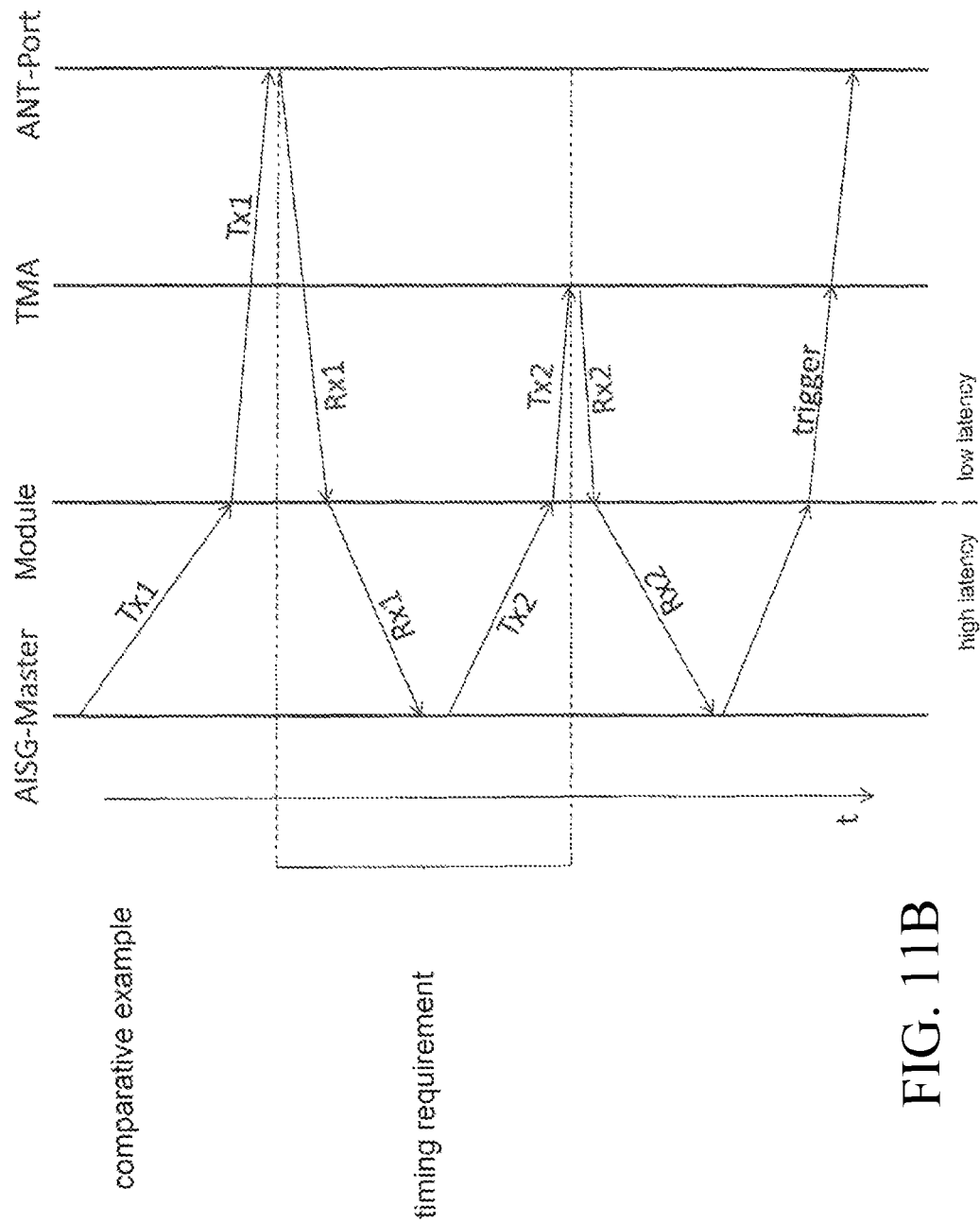
FIG. 11B shows a comparative example, which illustrates the processing without the functionality of the communication module according to the present disclosure, and in which the timing requirement cannot be observed.

FIG. 11B shows again a comparative example, which illustrates the sequence of operations over time, if the module does not support any sequences and if all the data packets are therefore sent individually from the AISG master. Also in this case, the timing requirement cannot be observed due to the high latencies between master and module.

Making reference to FIGS. 12 to 15, a further functionality of a control system according to the present disclosure in accordance with a third aspect of the present disclosure will now be described. Also this functionality can be used for arbitrary applications, but optionally, as described above in connection with the first and second aspects, it can be used in the control of antenna components.

In the case of most of the communication protocols, also so-called polling data packets may, optionally, regularly be transmitted, in addition to the actual control commands, between the controller and the terminal. These polling data packets do normally not comprise any user data, but these polling data packets are used for keeping the terminals in a desired operating mode and for giving the terminals the possibility of sending to the master, e.g. status or alarm messages, as a response to the polling data packet.

According to a third aspect of the present disclosure, this polling function can be transferred from the controller, e.g. the master, to the communication module. The data volume of communication between the master and the communication module can thus be kept as small as possible. This is relevant especially in connection with data links whose operating costs rise with the data volume.

To this end, the communication module according to the present disclosure has a polling mode in which it forwards polling commands to the connected slaves at predetermined intervals automatically and without being requested to do so by a request from the master.

The slaves are here kept in the desired operating mode via the polling and they are given the possibility of sending status and/or alarm messages as a response to a polling frame. If no status and/or alarm message is sent, the slaves will answer with a polling response without any useful content. If the slaves do not receive any polling command for a certain period of time, they may optionally switch to a basic mode and/or lose their addressing.

Furthermore, all the embodiments are so conceived that the communication module will not send back all the polling responses of the slaves to the master, but only the first polling response to the first polling command. The data volume is thus reduced still further. Status and/or alarm messages as a response to a polling command will, however, always be relayed to the master.

In the embodiment according to the present disclosure, polling takes place via the OSI layer 2 (L2). The polling commands and the polling responses are therefore communicated via layer 2, whereas actual control commands and their responses are communicated via the OSI layer 7 (L7). Hence, also status and alarm messages of the slaves, which are forwarded as a response to a polling command, are communicated via layer 7.

The polling mode may here optionally be started by the master. For terminating the polling mode of the communication module, different embodiments are available, which will be described in more detail hereinafter.

In the case of all these embodiments, a command "polling" is provided, through which the master switches on the polling mode of the communication module. This command "polling" may be transmitted e.g. together with a polling command in a request.

Figure 12:
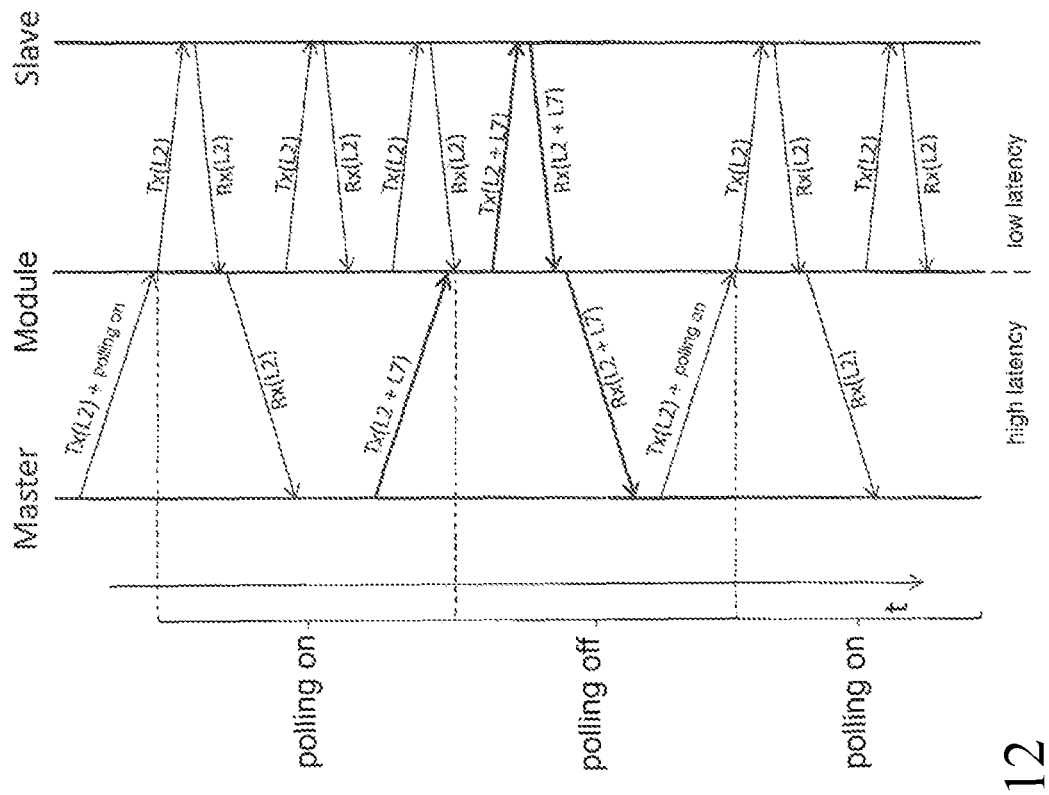
FIG. 12 shows a communication diagram depicting a polling function of a communication module according to the present disclosure, with a first variant for switching off the polling function.
Figure 13:
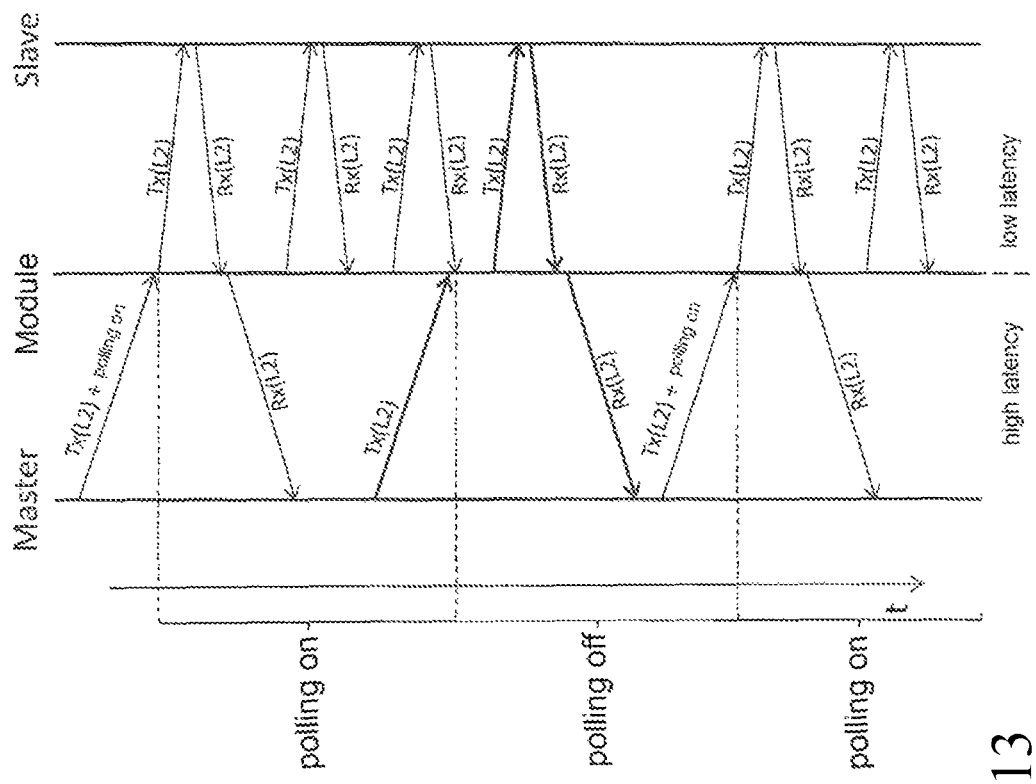
FIG. 13 shows a communication diagram depicting the polling function of the communication module according to the present disclosure, with a second variant for switching off the polling function.
Figure 14:
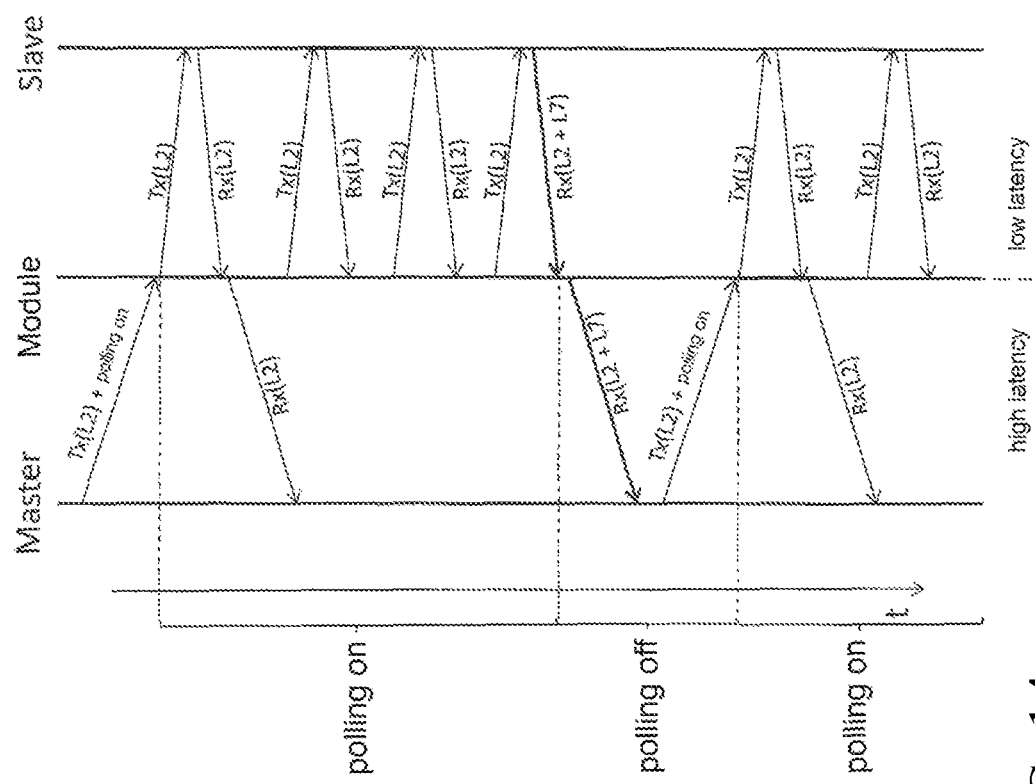
FIG. 14 shows a communication diagram depicting the polling function of a communication module according to the present disclosure, with a third variant for switching off the polling function.

Switching off of the polling mode of the communication module is executed in FIG. 12 in that the master transmits on layer 7 a control command, which is intended for the slave. In the embodiment according to FIG. 13 switching off is executed in that the master sends a further polling command via layer 2. In the embodiment according to FIG. 14 also the slave has the possibility of switching the polling off. In particular, the communication module will switch off the polling mode, if it receives from the slave a response via layer 7, e.g. a status or alarm message. It follows that switching off of the polling mode is executed in these variants via control commands and responses, respectively, which are exchanged between master and slave and which are additionally understood as a switch-off signal by the communication module.

Figure 15:
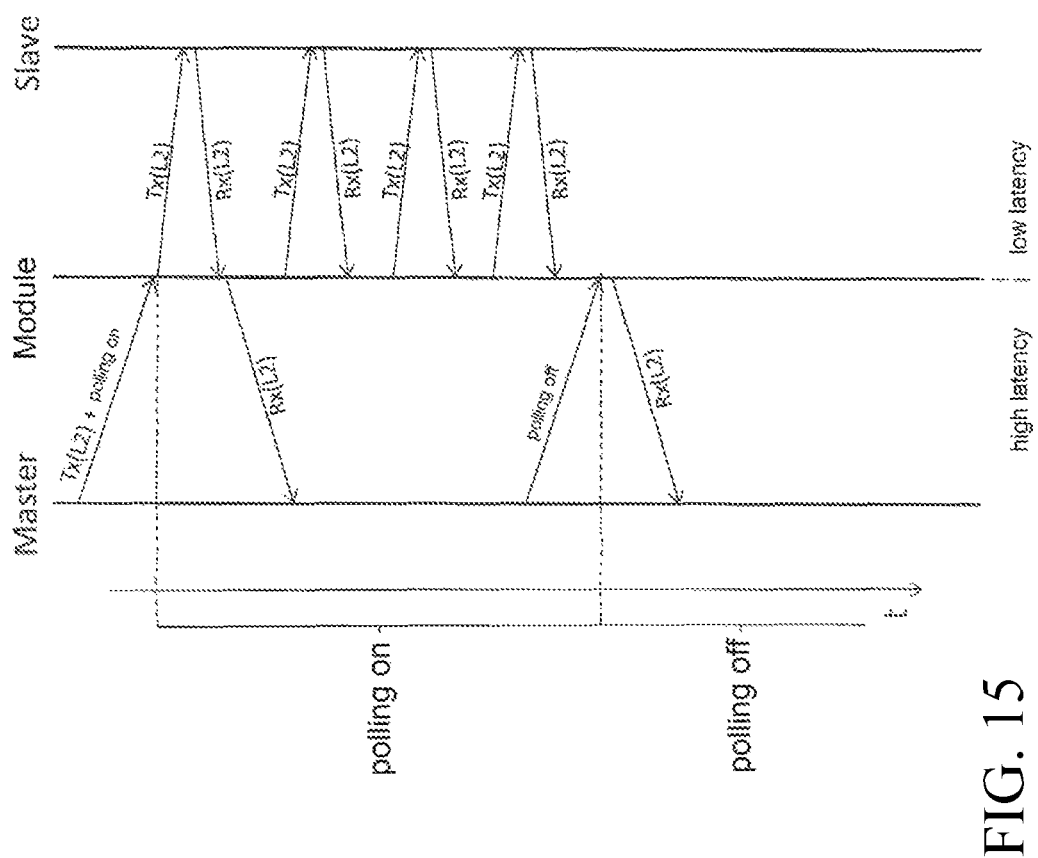
FIG. 15 shows a communication diagram depicting the polling function of a communication module according to the present disclosure, with a fourth variant for switching off the polling function.

In the embodiment shown in FIG. 15, however, an explicit command "polling-off" is provided for switching off the polling mode, said command being sent from the master to the module.

According to a possible embodiment of the present disclosure also a plurality of or all of the above-mentioned control possibilities for polling may be provided. In particular, the communication module may switch off the polling mode, if it receives either an additional polling command via layer 2 or a command via layer 7 from the master, said commands being relayed to the slave, or an explicit polling-off command from the master, or if the slave sends back a response via layer 7, e.g. a status or alarm message.

Figure 16:
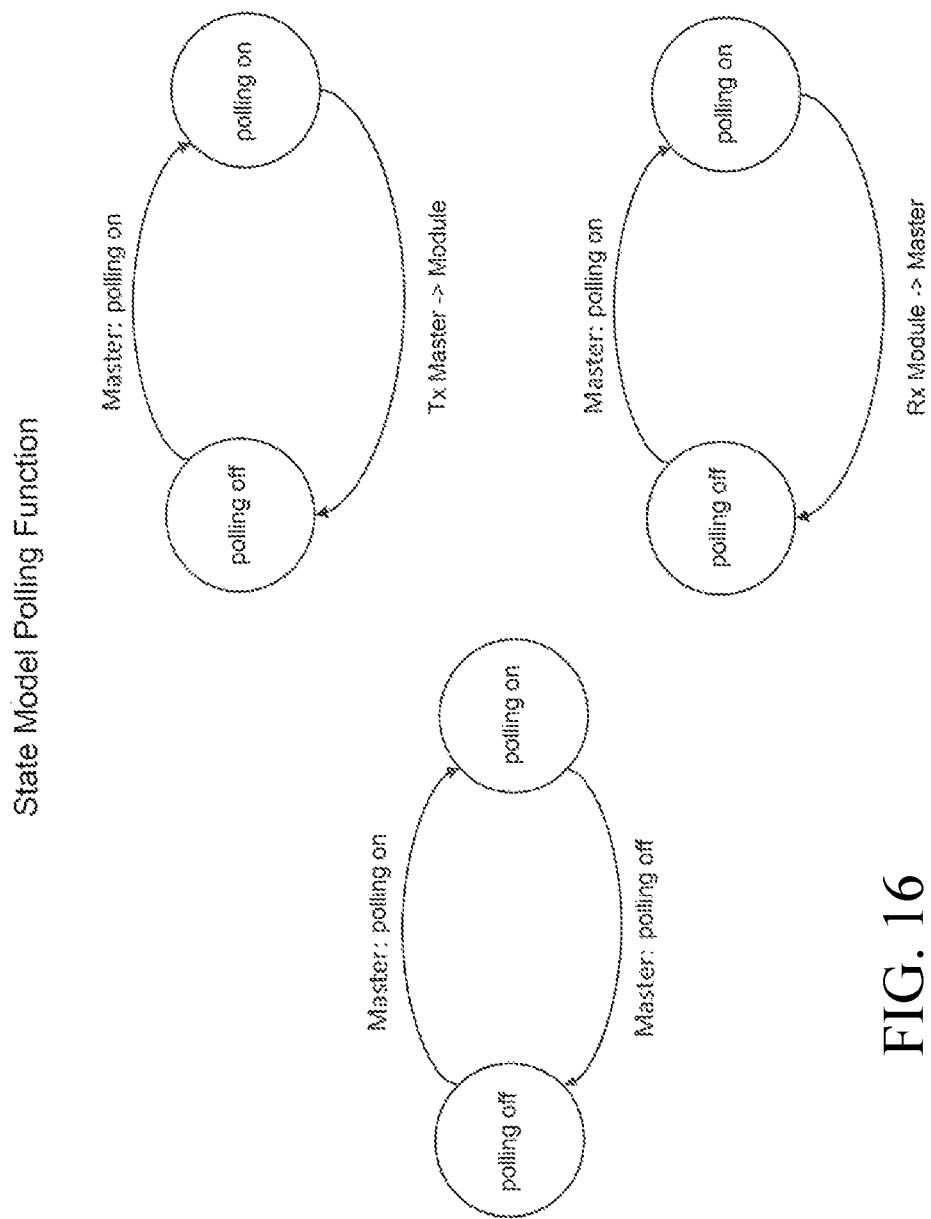
FIG. 16 shows a state model for the polling function, said state model depicting the variants shown in FIGS. 12 to 14.

In FIG. 16 respective state models are shown.

In an alternative embodiment it would also be imaginable that the polling mode of the communication module can be switched on and off by sending a polling command by means of the master. In this case, also the use of a separate command for switching on the polling mode could be dispensed with.

The third aspect according to the present disclosure may be realized alone as well as in combination with the first and/or second aspect.

The communication module represents according to all the aspects of the present disclosure the mating party to the controller working as a master, and may provide one or a plurality of software and/or hardware communication interfaces to possible terminals. The communication interfaces may e.g. be an UNIX domain socket, a network interface (LAN), and an AISG connector, a WiFi-AP and/or a coaxial connection.

As seen from the perspective of the terminals, the module is transparent. This has the advantage that existing terminals can be operated by the method according to the present disclosure, without adaptation, by means of a remote controller and the communication module.

Figure 17:
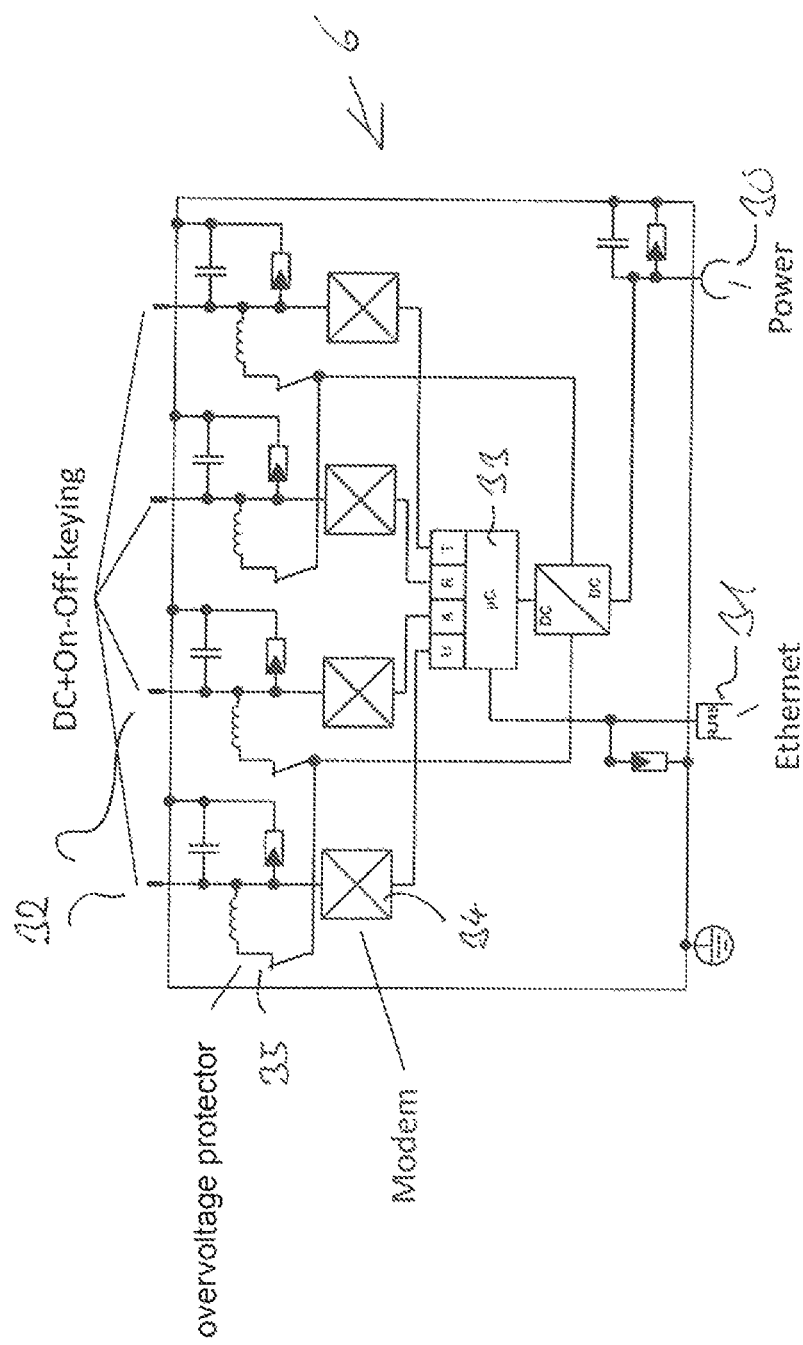
FIG. 17 shows a circuit diagram of an embodiment of a communication module according to the present disclosure.

FIG. 17 shows a circuit diagram of a possible embodiment of a communication module according to the present disclosure. The communication module 6 first comprises a power supply 30. In addition, an Ethernet connection 31 is provided, which serves to communicate with the master of the control system (e.g., remote controller). For communication with the terminals, the communication module has a plurality of interfaces 32, the present embodiment comprising four interfaces for communicating separately with e.g. four terminals. Communication takes place via modems 34 which are associated with the individual interfaces. The control of the communication module takes place via a microcontroller 33 with suitable software (e.g., a set of instructions stored in non-transitory memory of the microcontroller and executable by a processor to perform the control actions associated with the communication module which are described herein). In the present embodiment, communication with the terminals is executed via on-off-keying, which is superimposed on a DC voltage. In addition, an overvoltage protector 35 is provided. The interfaces to the terminals are serial UART interfaces.

When each of the three aspects is realized, the communication module receives the parameters and the information of the controller, communicates, in accordance with the timing requirements made available thereto, the parameters and information to the terminals, ascertains the timing of this communication between module and terminals, and is able to carry out the polling function of the controller. The result of the communication, including the timing values ascertained, is communicated to the controller.

The present disclosure has in particular the following advantages:
- The influence of network- and medium-given latencies is minimized to a large extent.
- Controllers, remote from the terminals, can be mapped to central (virtual) servers.
- The method, including the controller and the module, is transparent as seen from the perspective of the terminals, and, consequently, the latter need neither be modified nor adapted.
- Data volumes between the controller and the module can be reduced substantially (the polling function is transferred from the terminal to the module), whereby, e.g. in the event that a fee-based mobile radio connection is used, these costs can be reduced to a substantial extent.
- All the advantages resulting from the use of server technologies (scalability, maintenance, monitoring, back-up and restore, lower costs and lower complexity of appliances).

The invention claimed is:

1. A control system comprising a master, at least one slave, and a communication module which is arranged between the master and the at least one slave and through which the master and the at least one slave communicate, wherein the master sends control commands for controlling the at least one slave and said at least one slave responds to the control commands of the master, wherein the communication module relays the respective control commands and responses, wherein the master transmits to the communication module in one or a plurality of requests at least one control command and at least one associated timing requirement, wherein the communication module processes the request or the plurality of requests by relaying the at least one control command according to the at least one timing requirement to the at least one slave, wherein the timing requirement concerns a temporal distance between the sending of two control commands by the communication module and/or a temporal distance between the reception of a response from the slave and the sending of a control command by the communication module.

2. The control system according to claim 1, wherein the communication module is connected to the at least one slave via a communication link with a lower and/or defined latency and wherein the master is connected to the communication module via a communication link with a higher and/or non-defined latency, and/or wherein the master communicates with the communication module via a network.

3. The control system according to claim 1, wherein the master sends in one or a plurality of requests, at least two control commands, and at least one associated timing requirement to the communication module, wherein the communication module sends the two control commands to at least one slave successively with a temporal distance corresponding to the timing requirement and/or in a temporal sequence corresponding to the timing requirement and/or on the basis of a condition corresponding to the timing requirement.

4. The control system according to claim 3, wherein the request or the plurality of requests comprises a first control command to a first slave, a second control command to a second slave, and the timing requirement, wherein, after having received at least one of the plurality of requests, the communication module sends the first control command to the first slave and, after a period of time corresponding to the timing requirement, the second control command to the second slave.

5. The control system according to claim 1, wherein the communication module acknowledges the reception of the request and/or of the plurality of requests and/or of the control command of the master by sending an acknowledge signal.

6. The control system according to claim 1, wherein the communication module sends a plurality of responses of at least one slave in common to the master, wherein the communication module sends each of the responses together with at least one timing information, and/or wherein the communication module sends the plurality of responses of at least one slave each individually to the master.

7. The control system according to claim 1, wherein the communication module has a polling mode in which it sends, at predetermined time intervals automatically and without being requested to do so by request from the master, polling commands to the at least one slave, wherein only a polling response of the slave to a first or last polling command is relayed to the master, and/or wherein the master and/or the at least one slave are able to switch the polling mode on and/or off by sending a request and/or a control command and/or a response.

8. The control system according to claim 1, wherein the communication module identically relays, with respect to their information structure and their information content, the control commands and/or the responses comprised in one or a plurality of requests, wherein the communication module transmits the control commands and/or the responses comprised in said one or the plurality of requests via some other physical layer, and/or wherein the communication between the communication module and the master takes place via an Internet protocol.

9. The control system according to claim 1, wherein the at least one slave is a control component of a communication system, an antenna line device, and/or an amplifier, and/or wherein the communication module is integrated in a base station, and/or wherein the communication module communicates via high-frequency signal lines with the control component, and/or wherein communication between the master and the slave takes place according to the AISG standard and/or the control commands and/or the responses correspond to the AISG standard.

10. The control system according to claim 9, wherein the slave is a mobile communication antenna for operation at a mobile communication base station.

11. The control system according to claim 9, wherein the slave is an antenna control unit for controlling orientation of an antenna.

12. The control system according to claim 1, wherein the at least one slave is a control component of a satellite receiver and/or a satellite antenna.

13. The control system according to claim 1, for controlling a communication system comprising a plurality of slaves that are arranged remotely from one another, the control of the communication system being executed centrally in that centrally arranged masters communicate with slaves via respective communication modules arranged in an area of the slaves.

14. A control system comprising a master, at least one slave, and a communication module which is arranged between the master and the at least one slave and through which the master and the at least one slave communicate, wherein the master sends control commands for controlling the at least one slave and said at least one slave responds to the control commands of the master, wherein the communication module relays the respective control commands and responses, wherein the master transmits to the communication module in one or a plurality of requests at least one control command and at least one associated timing requirement, wherein the communication module determines timing information concerning the communication with the at least one slave and sends said timing information to the master, wherein the communication module determines a difference in time between the sending of a control command to a slave and the reception of a response from the slave, and sends it to the master, and/or wherein the communication module determines a transmission time when a control command is sent to a slave and/or a reception time of a response, and sends it or them to the master, and/or wherein the communication module sends the difference in time, the transmission time, and/or the reception time, together with the response from the slave, to the master.

15. A communication module for a control system, the control system comprising a master, at least one slave, and the communication module, the communication module being adapted to be arranged between the master and the at least one slave and relaying control commands of the master to the slave and responses of the slave to the master, wherein the communication module processes one or a plurality of requests of the master, with which the master transmits at least one control command and an associated timing requirement to the communication module, by sending the at least one control command according to the at least one timing requirement to the at least one slave, wherein the timing requirement concerns a temporal distance between the sending of two control commands by the communication module and/or a temporal distance between the reception of a response from the slave and the sending of the control command by the communication module.

16. A method for operating a control system comprising a master and at least one slave controlled via the master, the master and the at least one slave having arranged between them a communication module through which the master and the at least one slave communicate, wherein the master sends control commands for controlling the at least one slave and the at least one slave responds to the master's control commands, wherein the communication module relays the respective control commands and the responses, wherein the master transmits to the communication module in one or a plurality of requests at least one control command and an associated timing requirement, wherein the communication module processes the request or the plurality of requests by sending the at least one control command according to the at least one timing requirement to the at least one slave, wherein the timing requirement concerns a temporal distance between the sending of two control commands by the communication module and/or a temporal distance between the reception of a response from the slave and the sending of the control command by the communication module.

* * * * *